US010701053B2

(12) United States Patent
Kurian

(10) Patent No.: US 10,701,053 B2
(45) Date of Patent: Jun. 30, 2020

(54) AUTHENTICATION AND APPROVAL CONTROL SYSTEM FOR DISTRIBUTED LEDGER PLATFORM

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 334 days.

(21) Appl. No.: 15/907,514

(22) Filed: Feb. 28, 2018

(65) Prior Publication Data

US 2019/0268319 A1  Aug. 29, 2019

(51) Int. Cl.
*H04L 29/06* (2006.01)

(52) U.S. Cl.
CPC ............ *H04L 63/08* (2013.01); *H04L 63/083* (2013.01)

(58) Field of Classification Search
CPC ..... H04L 63/08; H04L 63/0807; H04L 63/10; H04L 63/101
See application file for complete search history.

(56) References Cited

U.S. PATENT DOCUMENTS

| 9,298,806 | B1 | 3/2016 | Vessenes et al. |
| 9,397,985 | B1 | 7/2016 | Seger, II et al. |
| 9,875,510 | B1 * | 1/2018 | Kasper .................... G06Q 40/12 |
| 2016/0261404 | A1 | 9/2016 | Ford et al. |
| 2016/0292680 | A1 | 10/2016 | Wilson, Jr. et al. |
| 2017/0140375 | A1 * | 5/2017 | Kunstel .................... G06Q 20/40 |
| 2017/0178237 | A1 | 6/2017 | Wong |
| 2018/0121635 | A1 * | 5/2018 | Tormasov ............. G06F 21/645 |
| 2018/0268401 | A1 * | 9/2018 | Ortiz ..................... G06Q 20/204 |
| 2018/0341648 | A1 * | 11/2018 | Kakavand ............... H04L 29/06 |
| 2019/0036702 | A1 * | 1/2019 | Kano ..................... G06Q 20/38 |
| 2019/0097807 | A1 * | 3/2019 | Mahanta ................. H04L 63/10 |
| 2019/0098009 | A1 * | 3/2019 | Lee .......................... G06F 21/32 |
| 2019/0116185 | A1 * | 4/2019 | Nagai .................... G06F 16/182 |
| 2019/0208418 | A1 * | 7/2019 | Breu ...................... H04L 9/3231 |
| 2019/0238316 | A1 * | 8/2019 | Padmanabhan ....... H04L 9/0637 |
| 2019/0238327 | A1 * | 8/2019 | Li .......................... H04L 9/3213 |

* cited by examiner

*Primary Examiner* — Khang Do
(74) *Attorney, Agent, or Firm* — Banner & Witcoff, Ltd.; Michael A. Springs

(57) ABSTRACT

Systems for controlling access to and modification of a distributed ledger are provided. A system may receive a request to modify a distributed ledger and may transmit a request for availability data to computing devices associated with a plurality of modification approval users. Availability response data may be received. In response to receiving a request for modification of a distributed ledger, one or more modification authentication approval devices may be identified and requirements executed. Authentication/approval response data may be received and analyzed to determine whether the requirements for the identified modification authentication approval device are met. If so, the modification may be approved. If not, the request to modify may be denied.

14 Claims, 18 Drawing Sheets

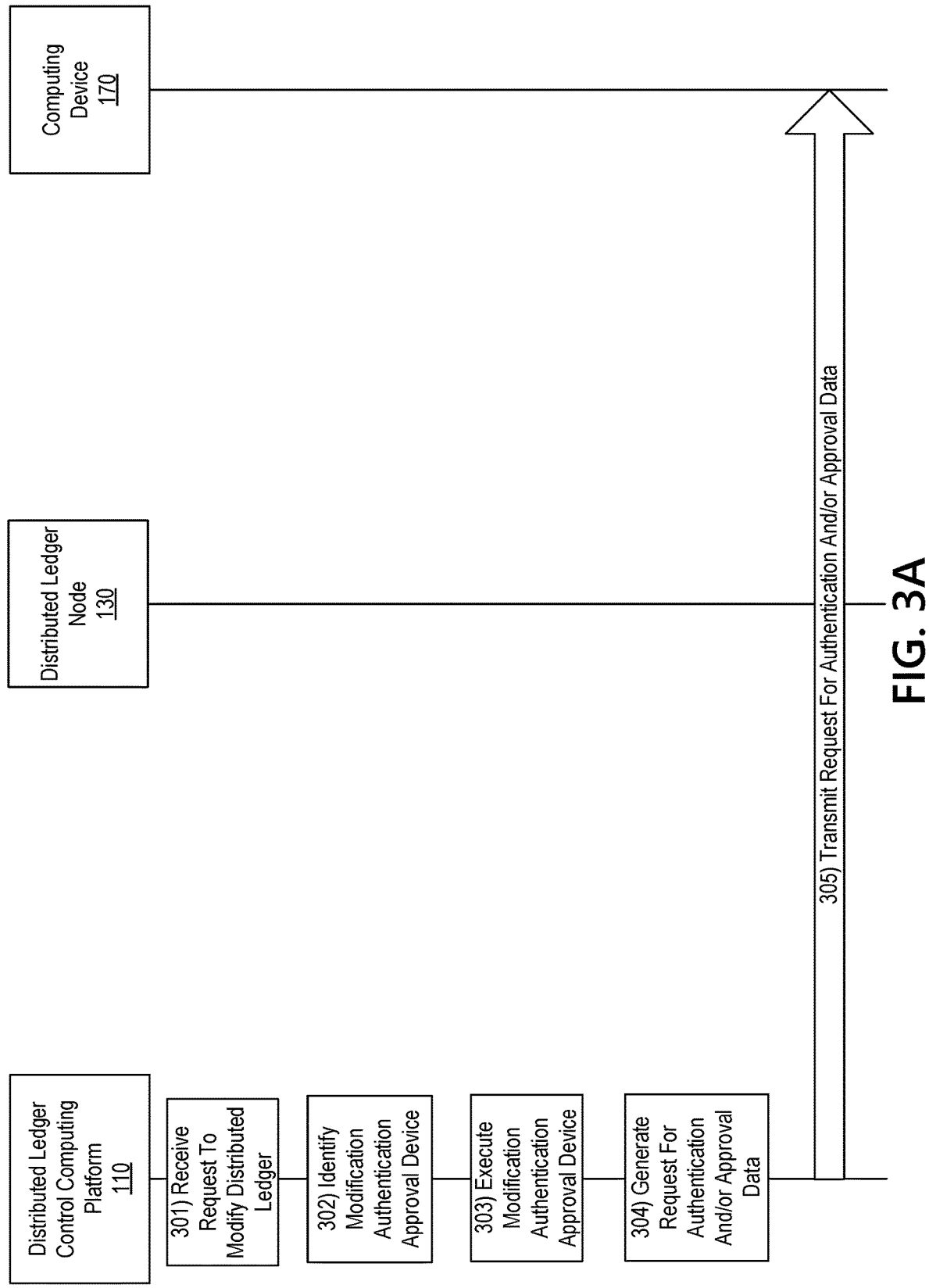

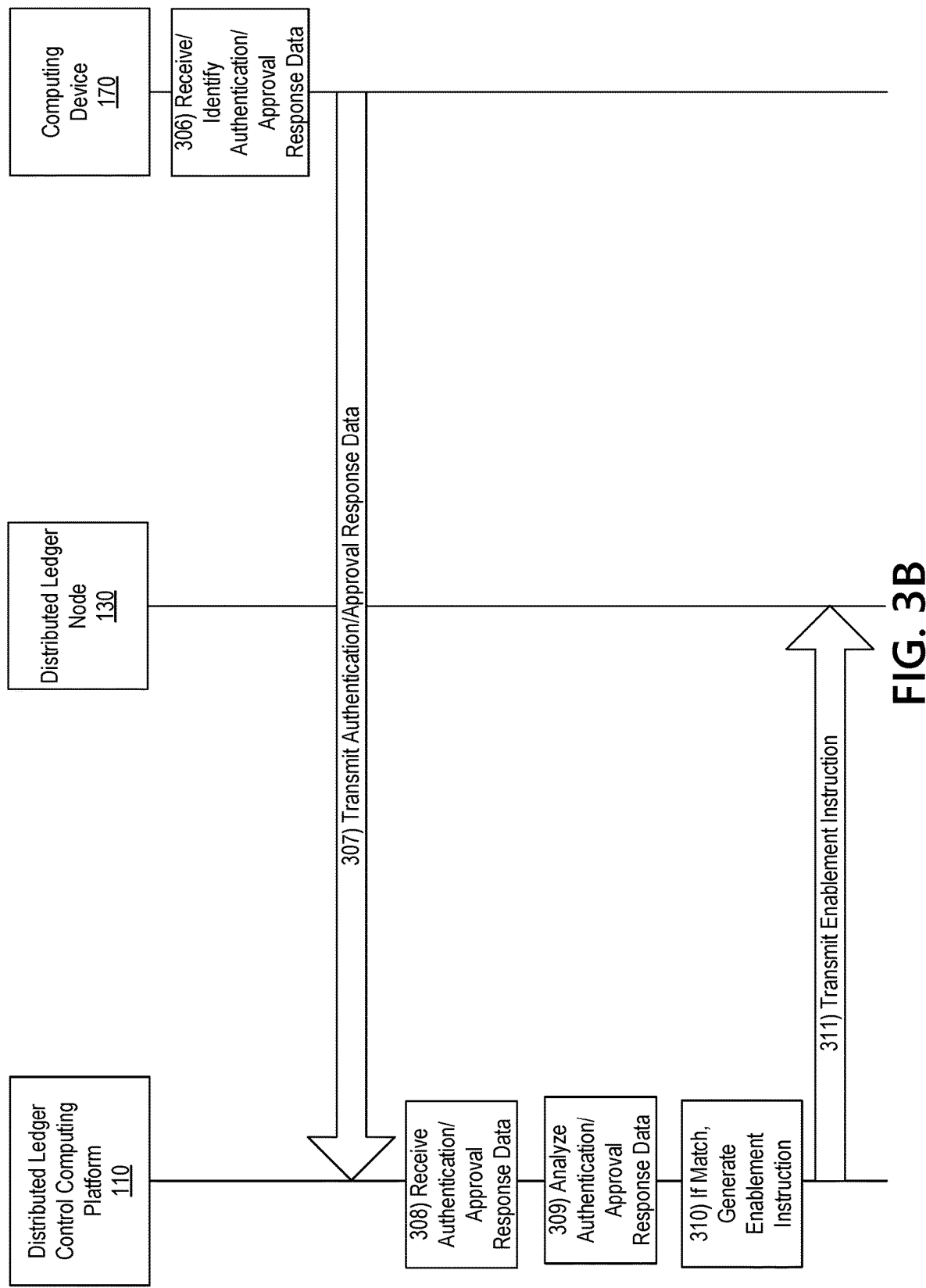

US 10,701,053 B2

AUTHENTICATION AND APPROVAL CONTROL SYSTEM FOR DISTRIBUTED LEDGER PLATFORM

BACKGROUND

Aspects of the disclosure relate to electrical computers, systems, and devices. In particular, one or more aspects of the disclosure relate to using authentication and approval control functions to control modifications to a distributed ledger.

Preventing unauthorized access to data and/or activity is a top priority for many entities. As distributed ledgers, such as Blockchain, become more commonly used in various industries, it is important to ensure that modification of the blocks or entries in the distributed ledger is a controlled process. Accordingly, many distributed ledger arrangements require approval of a predetermined number, percentage, or the like, of users. These users may be designated for approving modifications to the distributed ledger. However, the users might not always be available and/or user credentials may be susceptible to unauthorized access. Accordingly, systems for determining availability of approval users and controlling modification access for approval users may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with authentication and controlling approval of modifications to a distributed ledger.

In some examples, a system, computing platform, or the like, may receive a request to modify a distributed ledger. In response to the request, the system, computing platform, or the like, may transmit a request for availability data to computing devices associated with a plurality of modification approval users. In some examples, availability response data may be received from one or more computing devices associated with one or more modification approval users of the plurality of modification approval users. The availability response data may be analyzed to determine whether a number of available computing devices is at or above a threshold. If so, approval from a first percentage of modification approval users may be required to approve the modification. If not, approval from a second, different percentage of modification approval users may be required to approve the modification.

Additionally or alternatively, in response to receiving a request for modification of a distributed ledger, one or more modification authentication approval devices may be identified and executed. For instance, one or more requirements associated with the identified modification authentication approval devices may be implemented. A request for authentication and/or approval data may be transmitted to computing devices associated with the modification approval users. Authentication/approval response data may be received and analyzed to determine whether the requirements for the identified modification authentication approval device are met. If so, the modification may be approved. If not, the request to modify may be denied.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3C illustrate another illustrative event sequence for implementing distributed ledger control functions in accordance with one or more aspects described herein;

DETAILED DESCRIPTION

Figure 1A:
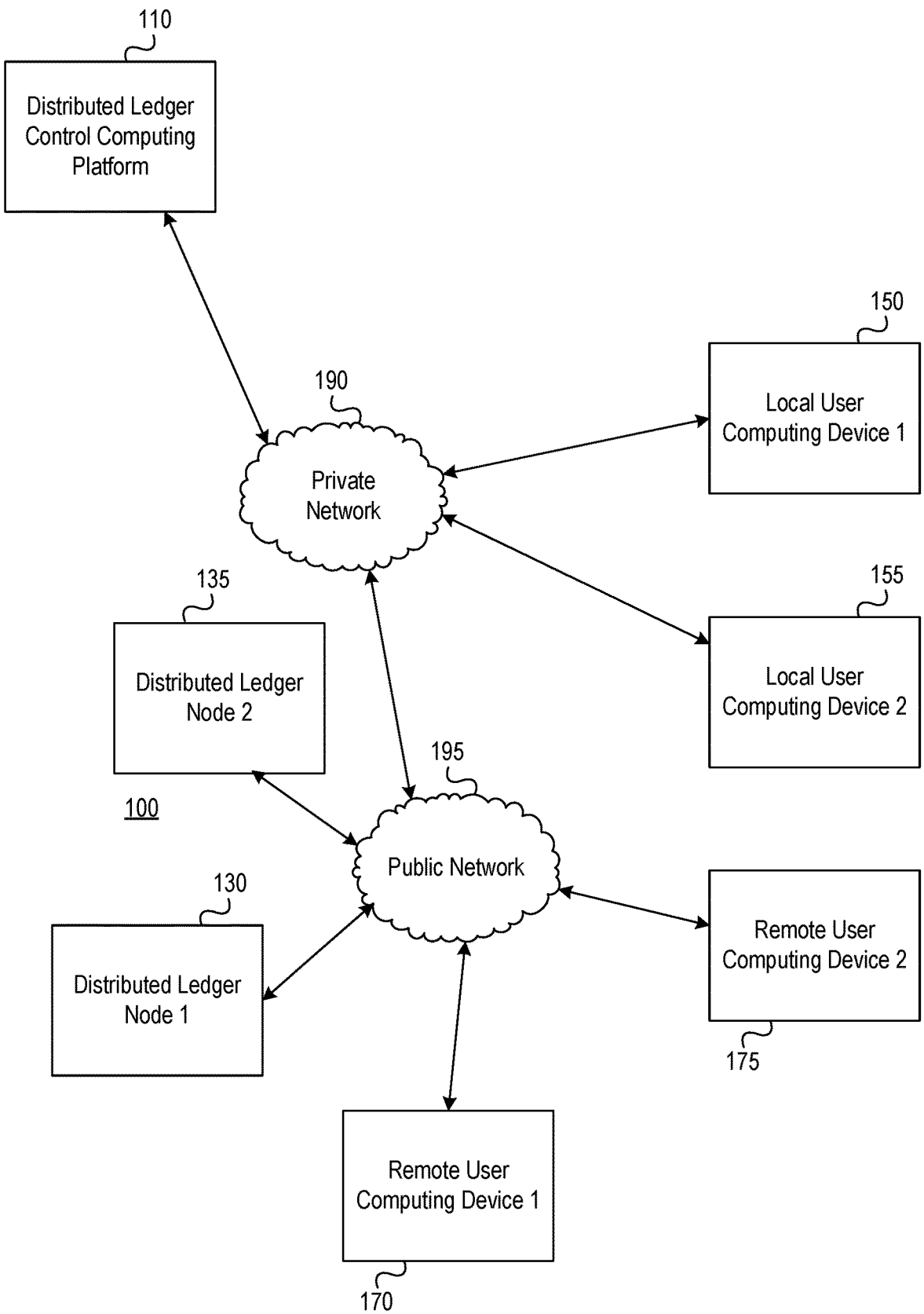
FIGS. 1A and 1B depict an illustrative computing environment for implementing distributed ledger control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to authentication and approval controls to control access to and modification of distributed ledger systems.

As mentioned above, distributed ledger systems are becoming more common in various industries. Accordingly, preventing unauthorized access to the distributed ledger systems and/or modification of the distributed ledger systems is important. Aspects described herein provide for authentication and approval controls that may be executed by a distributed ledger control computing platform or other system to authenticate modification approval users associated with the distributed ledger and validate approval response data received from the modification approval users.

In some examples, a request for modification of a distributed ledger may be received. In response to the request, the distributed ledger control computing platform or other system or device may generate and transmit a request for availability data to computing devices associated with a plurality of modification approval users. Availability response data may be received and may indicate a number of modification approval users (and associated computing devices) available to evaluate a requested modification and either approve or deny the modification.

In some examples, the number of modification approval users (and associated computing devices) may be compared to a threshold number of users for approval of the requested modification. If the available number is at or above the threshold, a first percentage of users must approve the modification in order for the modification to be considered approved. If the available number is below the threshold, a second, different percentage of users must approve the modification in order for the modification to be considered approved.

In additional or alternative examples, in response to a request to modify a distributed ledger, one or more modification authentication approval devices may be identified and executed. For instance, modification authentication approval devices such as requiring an approving user to be located at one of a plurality of predetermined authorized approval locations, requiring receipt of one or more tokens associated with a key for use in authenticating a modification approval user and validated approval response data, a unique identifier embedded in a previously modified block or entry of the distributed ledger and visible or accessible only by modification approval users, and the like, may be identified and executed. The distributed ledger control computing platform or other system or device may request authentication/approval data from the computing devices of the modification approval users and may compare received response data to requirements of the identified modification authentication approval device in order to authenticate the user, authorize modification, deny modification, or the like.

These and various other arrangements will be discussed more fully below.

Figure 1B:
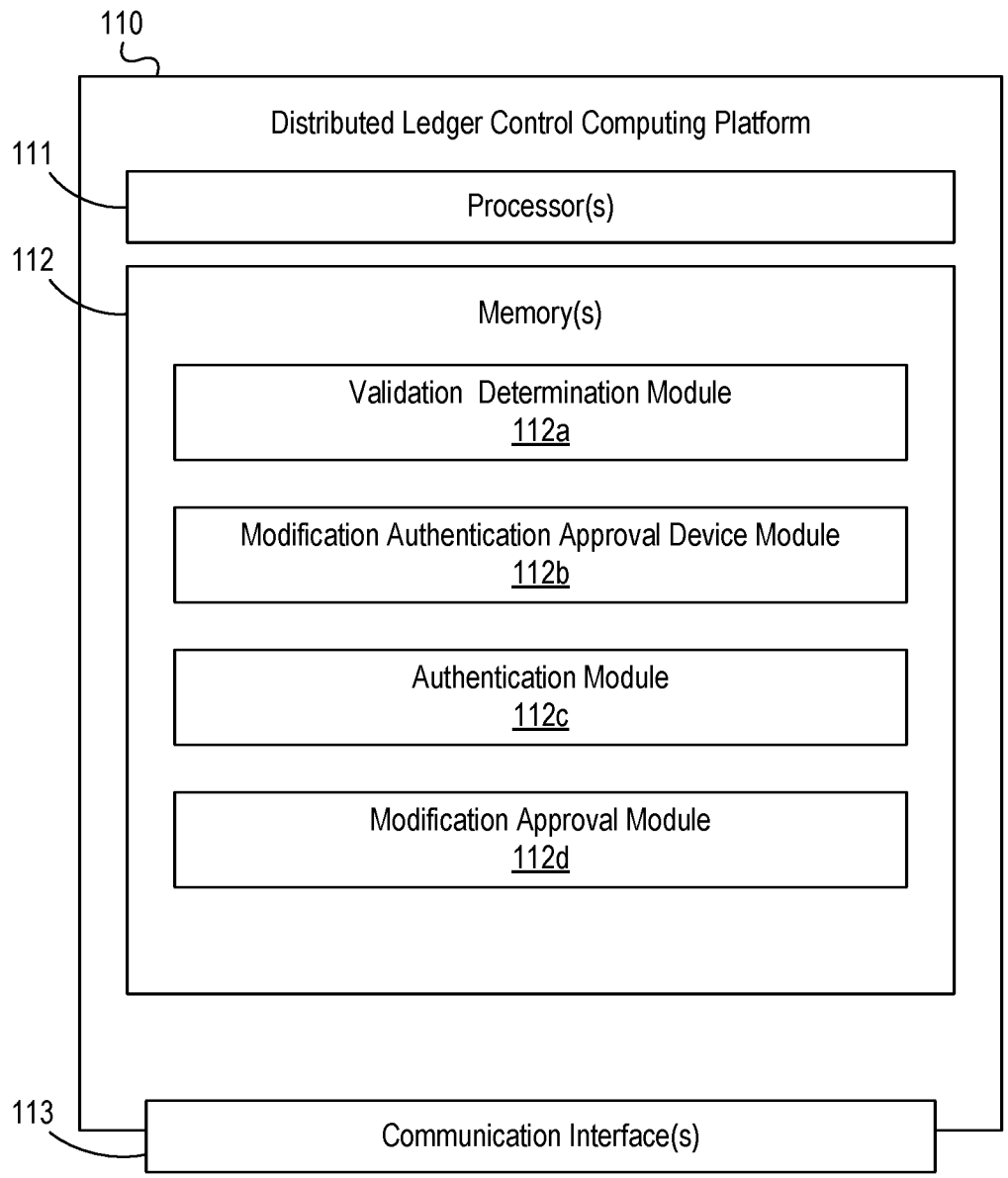

FIGS. 1A and 1B depict an illustrative computing environment for implementing and using a system for controlling authentication and authorization to modify a distributed ledger according to one or more aspects described herein. Referring to FIG. 1A, computing environment 100 may include one or more computing devices and/or other computing systems. For example, computing environment 100 may include a distributed ledger control computing platform 110, a first distributed ledger node 130, a second distributed ledger node 135, a first local user computing device 150, a second local user computing device 155, a first remote user computing device 170, and a second remote user computing device 175.

Distributed ledger control computing platform 110 may be configured to provide authentication and authorization control functions. In some examples, a request to modify a distributed ledger (e.g., Blockchain or other distributed ledger arrangement) may be received. In some examples, the distributed ledger control computing platform 110 may identify and execute one or more controls to authorize the modification and authenticate one or more users who are eligible to authorize the modification. For example, in some distributed ledger applications, one or more users or user systems may be required to authorize requested modifications (e.g., adding a block or entry, modifying a block or entry, or the like) prior to a modification being made. In some examples, the users or user systems may be specifically identified users or user systems who may be considered modification approval users having associated computing systems or devices. In some examples, upon receiving a request for modification, the distributed ledger control computing platform 110 may receive data from one or more computing devices of the modification approval users indicating an availability. In some examples, the availability data received may be received from a subset of computing devices including fewer than all computing devices associated with all modification approval users. For instance, global positioning system (GPS) or other location data may be used to determine whether a user computing device is considered available, as will be discussed more fully herein. A number of computing devices of the modification approval users identified as available may be compared to a threshold (e.g., a threshold number of available devices to approve modification, a threshold number of devices, or the like). If the number of computing devices is at or above the threshold, a first percentage of modification approval users or computing devices may be required to approve the modification. If the number of computing devices is below the threshold, a second, different percentage of modification approval users or computing devices may be required to approve the modification.

Additionally or alternatively, in some examples, one or more modification approval authentication devices may be generated and/or implemented by the distributed ledger control computing platform 110. For instance, in some examples, upon modifying or generating a block or entry in the distributed ledger, a unique approval identifier may be generated and included in the block or entry modified. In some examples, this unique identifier may be visible only to authorized modification approval users. Accordingly, when the block or entry is modified, the unique identifier may be transmitted to the modification approval users. However, if a modification approval user did not approve the block, he or she may view or otherwise obtain the identifier from the modified block or entry. The unique identifier may then be used as an authentication device when a second, subsequent request for modification is received.

In another example, a modification approval authentication device may include a split key having two tokens. The split key may be distributed to the authorized modification approval users. In some examples, one token may be used to authenticate a user to, for example, login to a modification approval system, and the second token may be used to approve the requested modification.

In still other examples, the modification approval authentication device may include identification of one or more predetermined locations (e.g., predetermined approval locations) from which the approval must be received. For example, one or more authorized approval locations may be predetermined and transmitted to the modification approval users. When a request to modify the distributed ledger is received, global positioning system (GPS) or other location data may be received from the modification user computing device and compared to the predetermined list of authorized approval locations. If the GPS data matches data associated with an authorized approval location, the user may be authenticated and the approval may be accepted. If not, the approval might not be accepted and/or additional information may be requested.

Various other modification approval authentication devices may be used without departing from the invention.

Computing environment 100 may further include a plurality of distributed ledger nodes, such as first distributed ledger node 130, and second distributed ledger node 135. The distributed ledger nodes 130, 135 may include computing devices that may individually maintain copies of the distributed ledger, update the distributed ledger with modifications, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by distributed ledger control computing platform 110, receive and transmit requests to modify the distributed ledger, and the like. In some examples, local user computing device 150, 155 may be modification approval user computing devices, may provide modification approvals, provide authentication information, and the like.

The remote user computing devices 170, 175 may be used to communicate with, for example, distributed ledger control computing platform 110, receive and display notifications, transmit data, such a global positioning system (GPS), sensor, or other data to the distributed ledger control computing platform 110, provide authentication information, provide modification approvals, and the like. In some examples, remote user computing devices 170, 175 may be modification approval user computing devices.

In one or more arrangements, distributed ledger node 130, distributed ledger node 135, local user computing device 150, local user computing device 155, remote user computing device 170, and/or remote user computing device 175 may be any type of computing device or combination of devices capable of performing the particular functions described herein. For example, distributed ledger node 130, distributed ledger node 135, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of distributed ledger node 130, distributed ledger node 135, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include distributed ledger control computing platform 110. As illustrated in greater detail below, distributed ledger control computing platform 110 may include one or more computing devices configured to perform one or more of the functions described herein. For example, distributed ledger control computing platform 110 may include one or more computers (e.g., laptop computers, desktop computers, servers, server blades, or the like).

As mentioned above, computing environment 100 also may include one or more networks, which may interconnect one or more of distributed ledger control computing platform 110, distributed ledger node 130, distributed ledger node 135, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, distributed ledger control computing platform 110, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect distributed ledger control computing platform 110, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., distributed ledger control computing platform 110, local user computing device 150, local user computing device 155) with one or more networks and/or computing devices that are not associated with the organization. For example, distributed ledger node 130, distributed ledger node 135, remote user computing device 170, and/or remote user computing device 175 might not be associated with an organization that operates private network 190 (e.g., because distributed ledger node 130, distributed ledger node 135, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect distributed ledger node 130, distributed ledger node 135, remote user computing device 170 and remote user computing device 175 to private network 190 and/or one or more computing devices connected thereto (e.g., distributed ledger control computing platform 110, local user computing device 150, local user computing device 155).

Referring to FIG. 1B, distributed ledger control computing platform 110 may include one or more processors 111, memory 112, and communication interface 113. A data bus may interconnect processor(s) 111, memory 112, and communication interface 113. Communication interface 113 may be a network interface configured to support communication between distributed ledger control computing platform 110 and one or more networks (e.g., private network 190, public network 195, or the like). Memory 112 may include one or more program modules having instructions that when executed by processor(s) 111 cause distributed ledger control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of distributed ledger control computing platform 110 and/or by different computing devices that may form and/or otherwise make up distributed ledger control computing platform 110.

For example, memory 112 may have, store, and/or include a validation determination module 112a. Validation determination module 112a may store instructions and/or data that may cause or enable the distributed ledger control computing platform 110 to evaluate a request to modify a distributed ledger to identify one or more controls to execute. For instance, the validation determination module 112a may receive a request to modify a distributed ledger and may determine whether a higher percentage of modification approval users is required to authorize the modification, whether one or more modification authentication approval devices should be identified and/or executed, and the like. In some examples, the validation determination module 112a may receive data, such as GPS or other location data from a computing device of one or more modification approval users to determine availability of the user for approval. For instance, if a computing device is within a threshold distance of a predetermined or identified location, the user may be considered available. If outside the threshold distance, the user may be deemed unavailable and one or more approval controls may be identified and executed.

Distributed ledger control computing platform 110 may further have, store and/or include a modification authentication approval device module 112b. Modification authentication approval device module 112b may store instructions and/or data that may cause or enable the distributed ledger control computing platform 110 to identify and/or execute one or more modification authentication approval devices. For instance, based on a type of modification request, user requesting modification, or other criteria, one or more modification authentication approval devices may be identified and executed. As discussed more fully herein, the one or more modification authentication approval devices may include requiring a user to be within a predetermined distance of a predetermined geographic location in order to be authenticated and provide approval data, generating a unique identified embedded in a modified block of the distributed ledger that may be visible only to modification approval users, generating a split key for use in authenticating the modification approval user to the system and/or approving the modification, and the like.

Distributed ledger control computing platform 110 may further have, store and/or include an authentication module 112c. Authentication module 112c may store instructions and/or data that may cause or enable the distributed ledger control computing platform 110 to receive authentication data from a computing device of a modification approval user and authenticate the user. In some examples, authenticating the user may include comparing the received data to pre-stored data to determine whether the received data matches the pre-stored data. In other examples, the authentication data may include one token of a split key that may be used to authenticate the user to the distributed ledger control computing platform 110. Various other authentication data may be provided without departing from the invention.

Distributed ledger control computing platform 110 may further have, store and/or include modification approval module 112d. Modification approval module 112d may store instructions and/or data that may cause or enable the distributed ledger computing platform 110 to receive approval status data from a computing device of a modification approval user. For instance, once a user has authenticated with the distributed ledger control computing platform 110 (e.g., via the authentication module 112c) the user may have to provide additional approval status data to indicate that he or she is an authorized modification approval user. For instance, the user may transmit one or more of the modification authentication approval devices, or data in response thereto, to the modification approval module 112d. The modification approval module 112d may analyze the received data to determine whether it matches pre-stored data, meets predetermined criteria, or the like.

In some examples, modification approval module 112d may compare a number of available computing devices of modification approval users to a predetermined threshold. If the number of available computing devices is at or above the threshold, a first percentage of modification user approvals may be required to authorize modification. If the number of available computing devices is below the predetermined threshold, a second, different percentage of users may be required for approval. In some examples, the second percentage may be higher than the first percentage. Accordingly, the modification approval module may then receive approvals (or disapproval) data from the one or more modification approval user computing devices and may authorize (or deny) the requested modification.

In examples in which one or more modification authentication approval devices are executed, the modification approval module 112d may evaluate the received responses to determine whether the modification is approved. If so, the modification approval module 112d may authorize the modification. If not, the modification approval module 112d may deny the requested modification. In some examples, the modification approval module 112d may generate and transmit an instruction or command to one or more distributed ledger nodes (such as distributed ledger node 130, distributed ledger node 135, or the like) to enable or permit modification of the distributed ledger.

FIGS. 2A-2D depict an illustrative event sequence for implementing and using distributed ledger control functions in accordance with one or more aspects described herein. The events shown in the illustrative event sequence are merely one example sequence and additional events may be added, or events may be omitted, without departing from the invention.

Figure 2A:
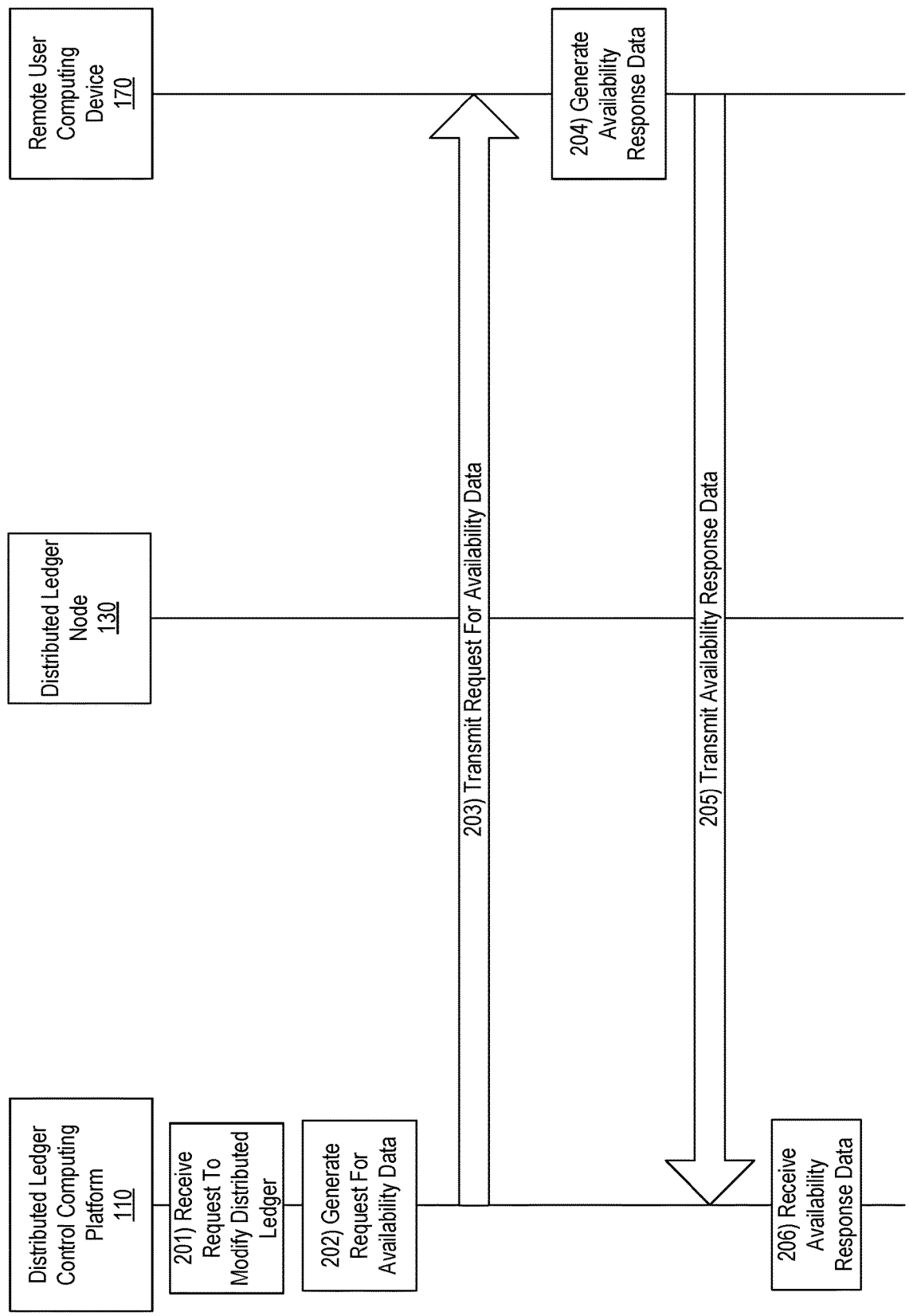
FIGS. 2A-2D depict an illustrative event sequence for implementing distributed ledger control functions in accordance with one or more aspects described herein.

Referring to FIG. 2A, at step 201, a request to modify a distributed ledger may be received from a computing device. For instance, in some examples, the request may be received from local user computing device 150, 155. In some arrangements, the request to modify the distributed ledger may include a request to add a block or entry to the distributed ledger.

At step 202, a request for availability data associated with computing devices of one or more modification approval users may be generated. For instance, in arrangements in which modifications to a distributed ledger must be evaluated and approved by one or more approval users, the distributed ledger computing platform 110 may generate a request to determine availability of the computing devices associated with the modification approval users. In some examples, a computing device of a modification approval user may be considered available if it is powered on, transmitting data, or the like.

In some arrangements, a computing device of a modification approval user may be considered available if it is within a predefined proximity of a predetermined location. For instance, global positioning system (GPS) or other data may be received from the computing device and compared to authorized approval locations (e.g., a home of a modification approval user, an office of a modification approval user, or the like) to determine whether the computing device is located at the approved location. If so, the device may be considered available.

At step 203, the generated request for availability data may be transmitted to the computing device of the modification approval users. In some examples, the generated request may be transmitted to the computing device of each modification approval user. Although only one computing device is shown in FIG. 2A, a plurality of remote user computing devices 150 (e.g., modification user approval devices) may be part of the system and may receive the request.

At step 204, availability response data may be generated by the computing device 150. For instance, the request for availability data may initiate a process at the remote user computing device 150 to generate response data including, for example, power status data (if available), GPS or other location data, or the like.

At step 205, the availability response data may be transmitted to the distributed ledger control computing platform 110 and, at step 206, the availability response data may be received by the distributed ledger computing platform 110. In some examples, availability response data may be received from a subset of all computing devices to which the request for availability data was transmitted. For instance, availability response data may be received from fewer than all computing devices to which the request for availability data was transmitted. In other examples, availability response data may be received from all computing devices to which the request for availability data was transmitted, but, in some arrangements, fewer than all computing devices to which the request for availability data was transmitted may respond as available (e.g., some may respond as unavailable).

Figure 2B:
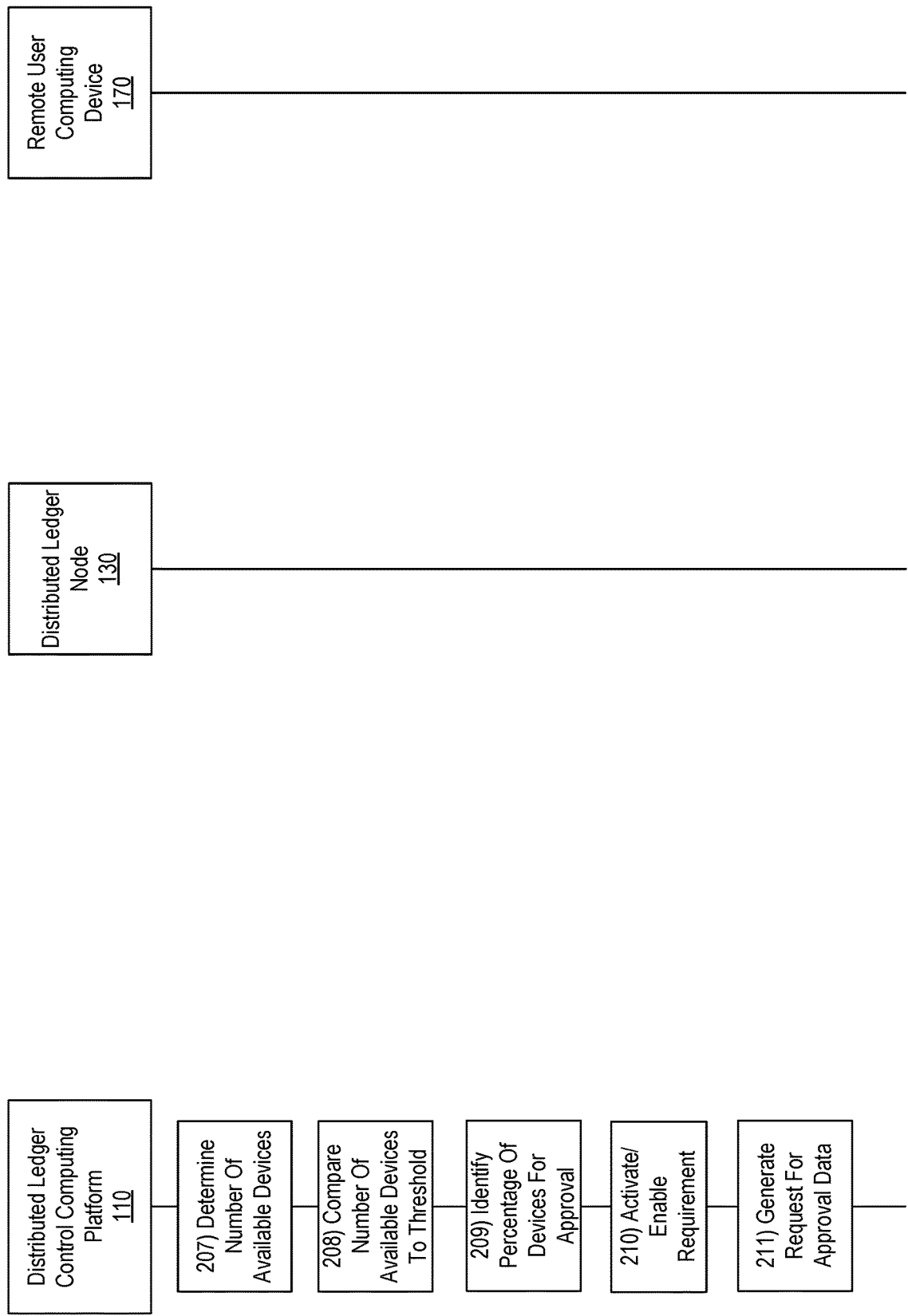

With reference to FIG. 2B, at step 207, the availability response data may be analyzed to determine a number of available computing devices and, correspondingly, a number of available modification approval users. At step 208, the number of available devices may be compared to a threshold number of devices. If the number of available computing devices of modification approval users is at or above the threshold, a first approval criterion may be executed. If the number of available computing devices of modification approval users is below the threshold, a second, different approval criterion may be executed.

Accordingly, at step 209, a criterion for approval may be identified. For example, a percentage of modification approval users approving the requested modification in order for the modification to be implemented may be determined or identified. For instance, if the number of available modification approval users is at or above the threshold, approval from a first percentage of modification approval users may be required in order to execute the modification. If the number of available modification approval user is below the threshold, approval from a second percentage, different from the first percentage of modification approval users may be required in order to execute the modification. In some examples, the second percentage may be higher than the first percentage.

At step 210, the criterion for approval identified in step 209 may be enabled. At step 211, a request for approval data may be generated by the distributed ledger control computing platform 110.

Figure 2C:
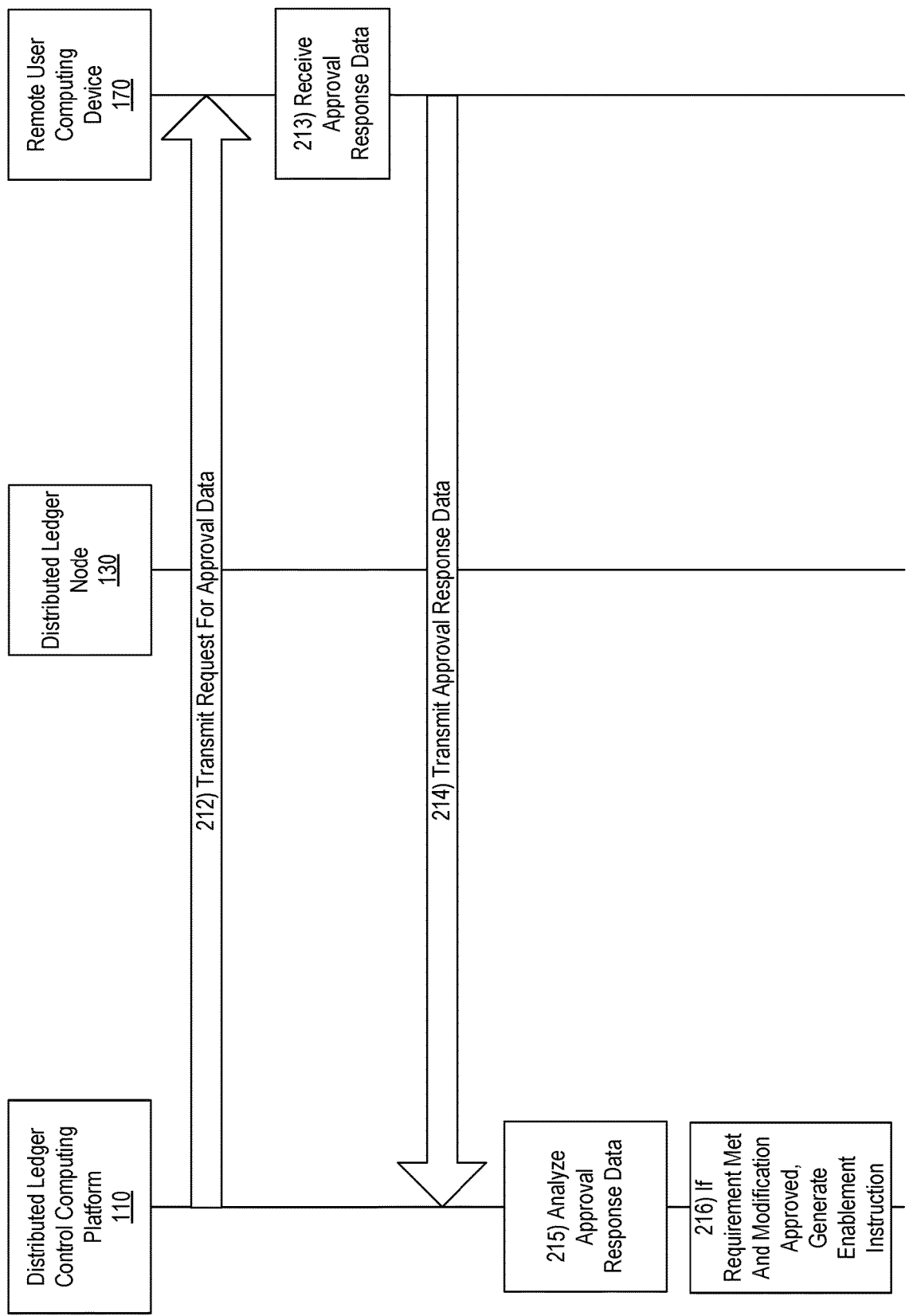

With reference to FIG. 2C, at step 212, the generated request for approval data may be transmitted to the modification approval user computing device (e.g., remote user computing device 150). In some examples, the request for approval data may be transmitted to all available modification approval user computing devices. In other examples, the request for approval data may be transmitted to all modification approval user computing devices, both available and unavailable.

At step 213, approval response data may be received by the computing device of the modification approval user (e.g., remote user computing device 150). For instance, the user may input whether he or she approves or does not approve the requested modification to generate approval response data. At step 214, the approval response data may be transmitted to the distributed ledger control computing platform 110.

At step 215, the approval response data may be analyzed to determine whether the modification is approved. For instance, the approval response data may be analyzed to determine whether at least the required percentage of modification approval users approve the requested modification. If not, a notification may be transmitted to a requesting user and the process may end.

If at least the required percentage of modification approval users approves the requested modification, an instruction enabling or activating modification functionality may be generated at step 216.

Figure 2D:
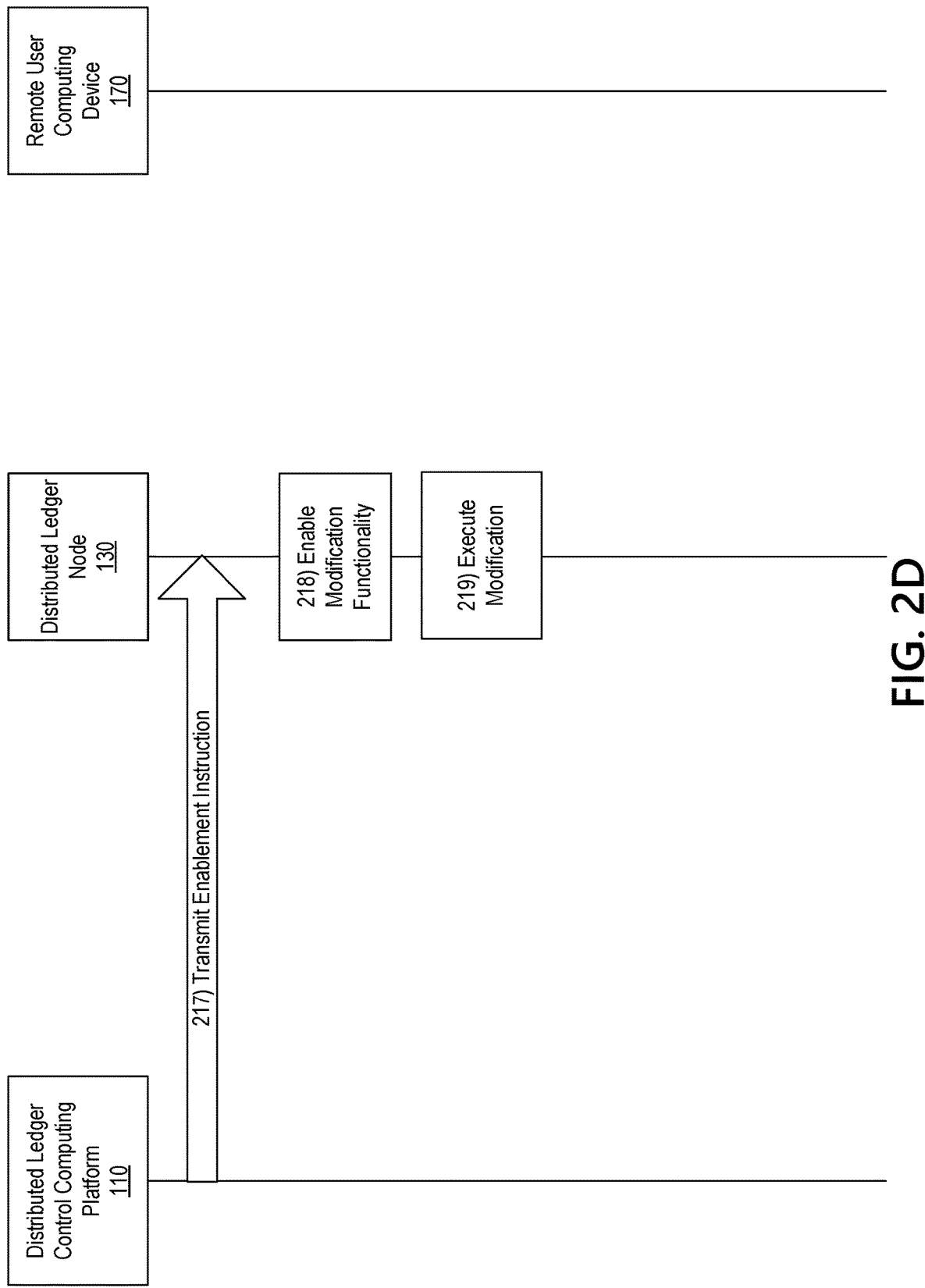

With reference to FIG. 2D, at step 217, the generated enablement instruction may be transmitted to one or more distributed ledger nodes 130. At step 218, the instruction may be executed by the distributed ledger node 130 to enable modification functionality (e.g., permit the approved, requested modification to be implemented) and/or cause the modification to be implemented or executed. At step 219, the modification may be executed or implemented.

Figure 3C:
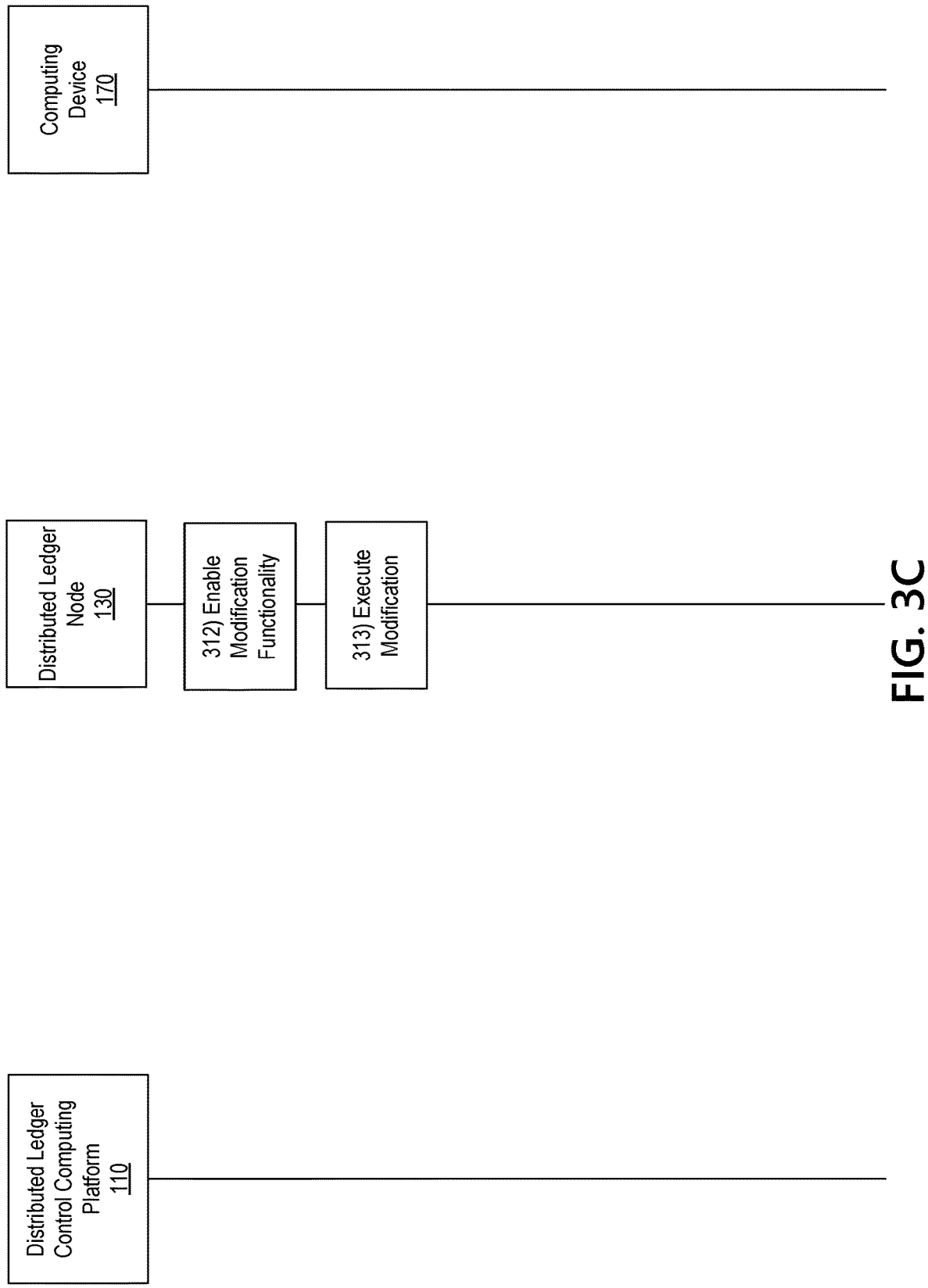

FIGS. 3A-3C depict another illustrative event sequence for implementing and using distributed ledger control functions in accordance with one or more aspects described herein. The events shown in the illustrative event sequence are merely one example sequence and additional events may be added, or events may be omitted, without departing from the invention.

Referring to FIG. 3A, at step 301, a request to modify a distributed ledger may a distributed ledger may be received from a computing device. For instance, in some examples, the request may be received from local user computing device 150, 155. In some arrangements, the request to modify the distributed ledger may include a request to add a block or entry to the distributed ledger.

At step 302, based on the request to modify the distributed ledger, one or more modification authentication devices may be identified. For instance, modification authentication devices such as geotagging, unique identifiers, predetermined locations, and the like, may be identified for use in authenticating a modification approval user and/or receiving and verifying approval data received from a modification approval user.

At step 303, the identified modification authentication device may be executed. For instance, one or more requirements associated with authenticating the modification approval user, receiving and verifying approval data from a modification approval user, and the like, associated with the identified one or more modification authentication approval devices may be executed to implement the requirements associated with the modification authentication approval device.

At step 304, a request for authentication and/or approval data may be generated. In some examples, the request for authentication and/or approval data may include a request for particular data based on the executed one or more modification authentication approval devices. For instance, in examples in which one requirement of the modification authentication approval device is for the remote user computing device 170 (e.g., the computing device of the modification approval user) to be transmitting data from a predetermined authorized location, the request may include a request for location or position (e.g., GPS) data. Various other types of data may be requested based on requirements of the executed one or more modification authentication approval devices.

At step 305, the request for authentication and/or approval data may be transmitted to the remote user computing device 170 (e.g., the computing device of the modification approval user). Although FIG. 3A illustrates transmission of the request to only one computing device, the request may be transmitted to a plurality of computing devices. In some examples, the request may be transmitted to computing devices associated with each modification approval user.

With reference to FIG. 3B, at step 306, authentication and/or approval response data may be received and/or identified by the remote user computing device 170 (e.g., the computing device of the modification approval user). For instance, user input such as authenticating information may be received. In some examples, one or more tokens stored on the remote user computing device 170 may be identified for use as authentication and/or approval response data. In some arrangements, current location data may be identified. Various other types of authentication/approval response data may be received and/or generated by remote user computing device 170.

At step 307, the authentication/approval response data may be transmitted to the distributed ledger control computing platform 110. At step 308, the authentication approval response data may be received by the distributed ledger control computing platform 110.

At step 309, the authentication/approval response data may be analyzed to determine whether it meets one or more criteria, matches pre-stored data, or the like. For instance, if the modification authentication approval device requires a modification approval user computing device to be located in a predetermined location in order to be authenticated and/or allow for approval data to be received and/or verified, the location data received from the remote user computing device 170 may be analyzed to determine whether it matches pre-stored location data associated with one or more authorized approval locations.

At step 310, if the criteria are met, an instruction enabling or activating modification functionality may be generated. At step 311, the generated enablement instruction may be transmitted to one or more distributed ledger nodes 130.

With reference to FIG. 3C, at step 312, the instruction may be executed by the distributed ledger node 130 to enable modification functionality (e.g., permit the approved, requested modification to be implemented) and/or cause the modification to be executed or implemented. At step 313, the requested modification may be executed or implemented by the distributed ledger node 130.

Figure 4A:
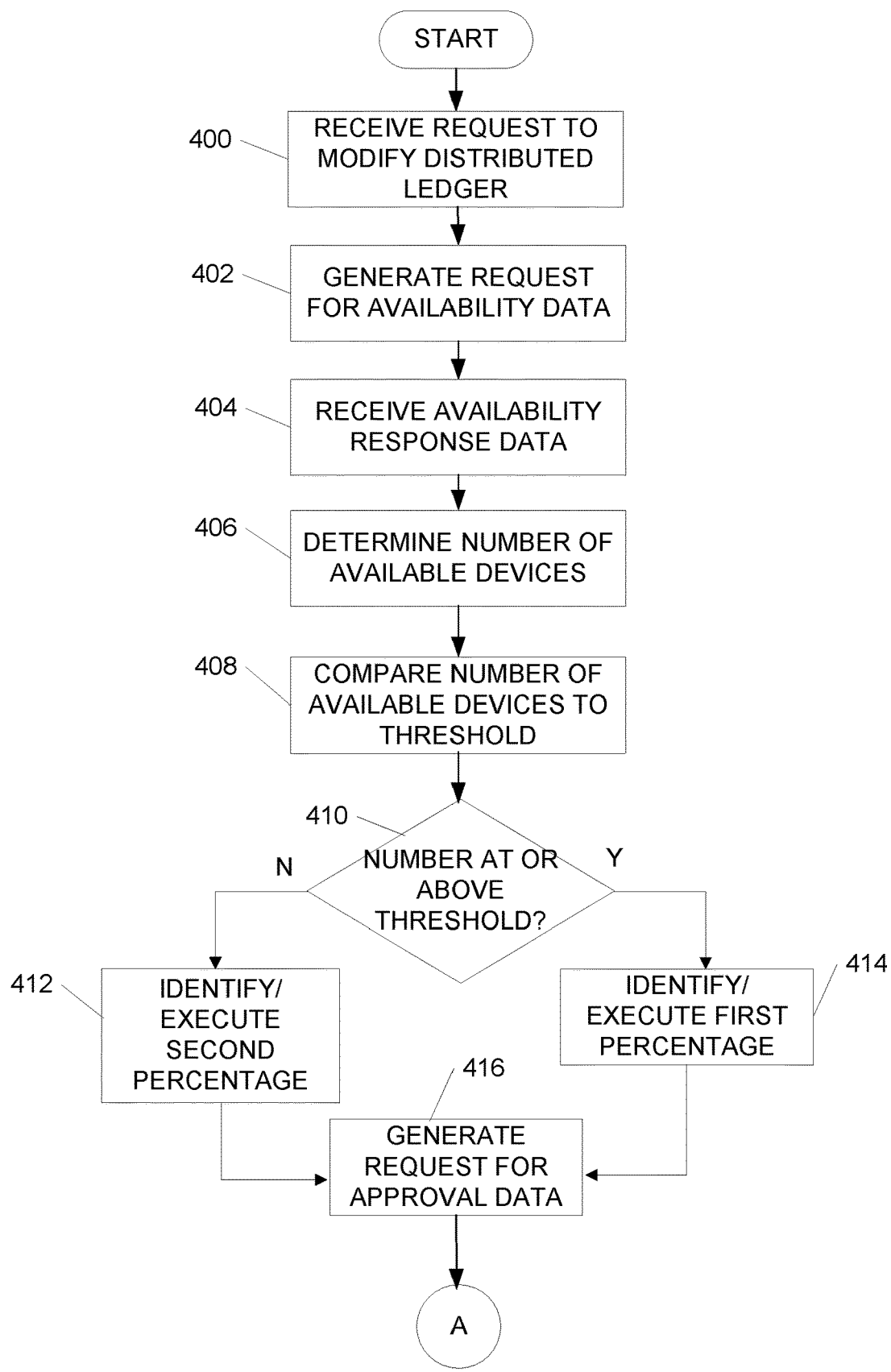
FIGS. 4A and 4B depict an illustrative method for implementing distributed ledger control functions in accordance with one or more aspects described herein.
Figure 4B:
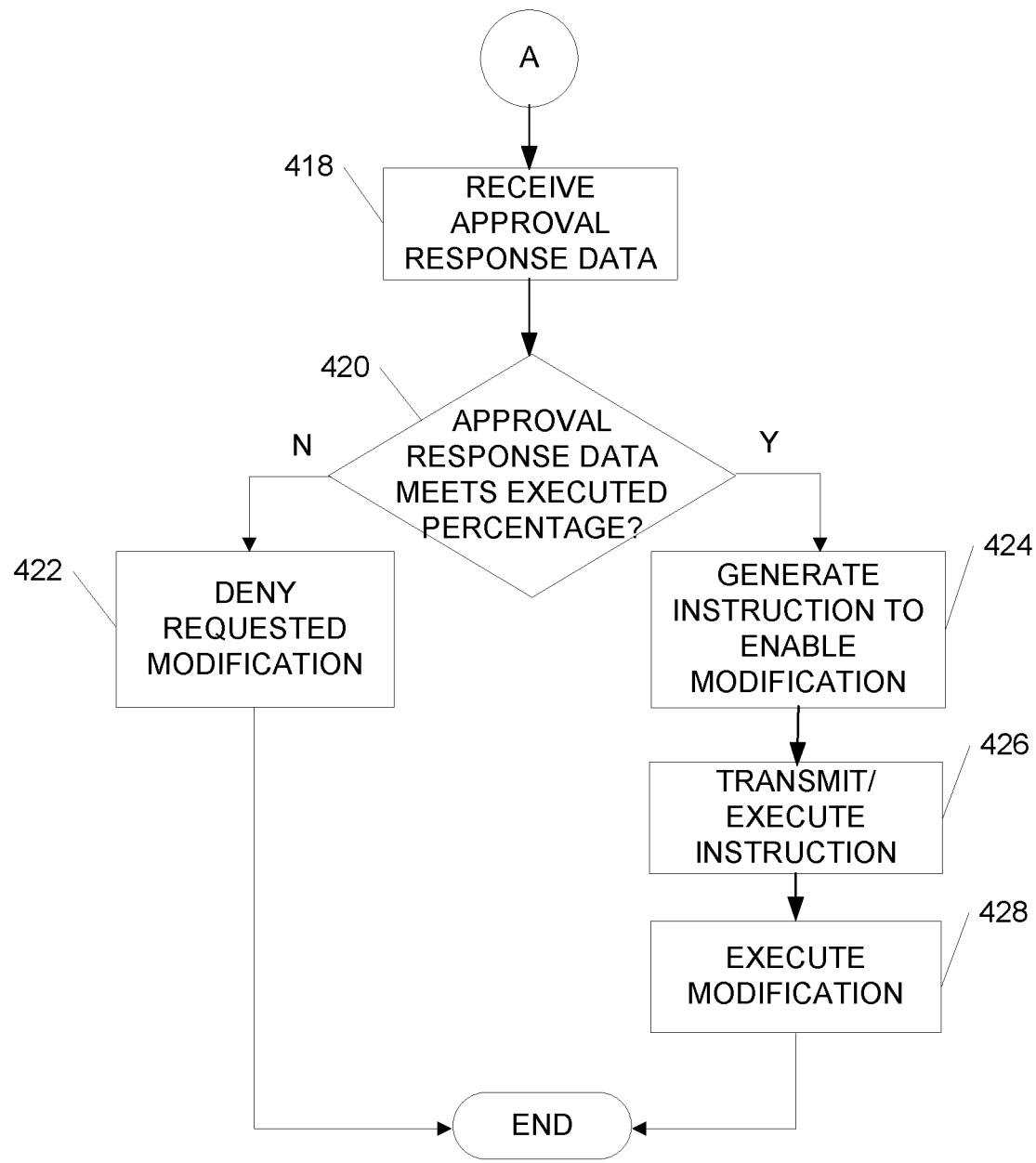

FIGS. 4A and 4B illustrate one example method of providing distributed ledger modification authentication and/or approval functions according to one or more aspects described herein. The processes illustrated in FIGS. 4A and 4B are merely some example processes and functions. The steps shown may be performed in a different order, more steps may be added, or one or more steps may be omitted without departing from the invention.

With reference to FIG. 4A, at step 400, a request to modify a distributed ledger may be received. In some examples, the request may be received from, for instance, local user computing device 150, 155. In some arrangements, the request may include a request to add a block or entry in the distributed ledger, modify a block or entry in the distributed ledger, or the like.

At step 402, a request for availability data may be generated. For example, a distributed ledger control computing platform 110 may generate a request for availability data to determine a number of computing devices of modification approval users (and, thus, modification approval users) available to evaluate the requested modification and provide a response regarding whether the requested modification is approved or denied. In some examples, the request for availability data may include a request for location data (e.g., global positioning system data) of the computing device. The request for availability data may then be transmitted to computing devices associated with the plurality of modification approval users. In some examples, the request may be transmitted to computing devices associated with each modification approval user (e.g., to computing devices of all the modification approval users).

At step 404, availability response data may be received from one or more computing devices of the computing devices of the modification approval users. In some examples, the availability response data may include location data (e.g., GPS, data from a geo-tag associated with a medication approval user computing device or profile, or the like), power status data, or the like. In some arrangements, the availability response data may be include user input received from a modification approval user indicating an availability status.

At step 406, the received availability response data may be analyzed to determine a number of available computing devices associated with modification approval users (and, thus, a number of modification approval users available). At step 408, the determined number of availability computing devices may be compared to a threshold number of approval computing devices.

At step 410, a determination may be made as to whether the determined number of available computing devices is at or above the threshold number of approval computing devices. If so, a first percentage of computing devices (e.g., percentage of total computing devices associated with modification approval users, percentage of available computing devices associated with modification approval users, or the like) required for approval of the requested modification may be identified and executed (e.g., implemented as a requirement for approval of the modification at step 414.

If, at step 410, the determined number of computing devices is below the threshold number of approval computing devices, a second percentage of computing devices (e.g., percentage of total computing devices associated with modification approval users, percentage of available computing devices associated with modification approval users, or the like) required for approval of the requested modification may be identified and executed (e.g., implemented as a requirement for approval of the modification) at step 412. The second percentage may be different from the first percentage and, in some arrangements, may be a higher percentage than the first percentage.

At step 416, a request for approval data may be generated and transmitted to one or more computing devices of modification approval users. In some examples, the request for approval data may be transmitted to all available computing devices associated with modification approval users. In other examples, the request for approval data may be transmitted to computing devices associated with all modification approval users (e.g., whether available or unavailable).

With reference to FIG. 4B, at step 418, approval response data may be received from one or more computing devices associated with modification approval users. At step 420, a determination may be made as to whether the approval response data meets the executed percentage (e.g., whether a sufficient number of computing devices approved the requested modification to meet the required percentage). If not, the requested modification may be denied at step 422.

If, at step 420, the approval response data does meet the executed percentage (e.g., the number of computing devices approving the requested modification meets the required percentage), at step 424, an instruction to enable modification functionality may be generated. At step 426, the generated instruction may be transmitted to one or more distributed ledger nodes 130, 135. At step 428, the instruction may be executed causing the one or more distributed ledger nodes to execute or implement the modification.

Figure 5:
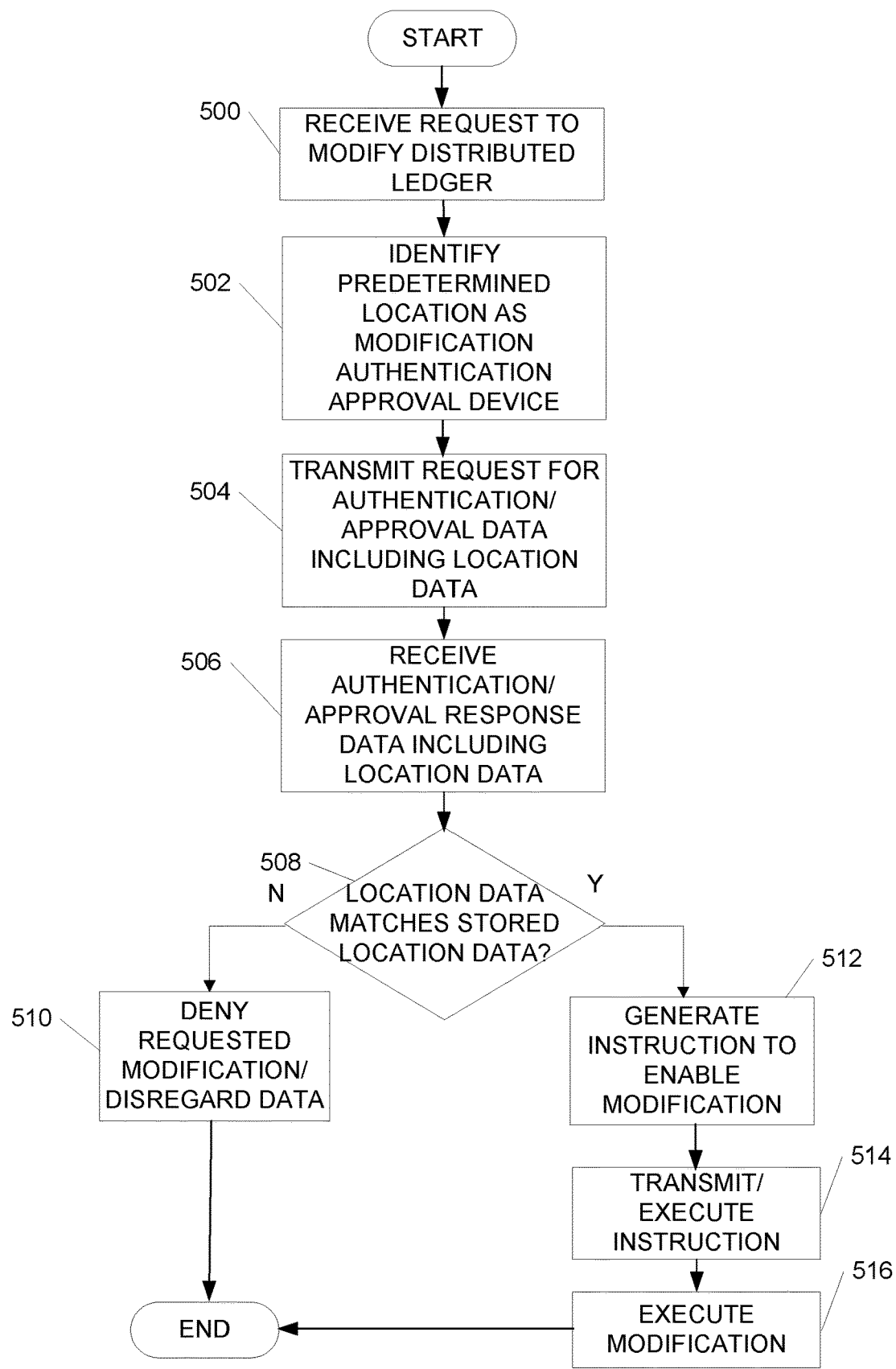
FIG. 5 depicts another illustrative method for implementing distributed ledger control functions in accordance with one or more aspects described herein.

FIG. 5 illustrates another example method of providing distributed ledger modification authentication and/or approval functions according to one or more aspects described herein. The processes illustrated in FIG. 5 are merely some example processes and functions. The steps shown may be performed in a different order, more steps may be added, or one or more steps may be omitted without departing from the invention.

At step 500, a request to modify a distributed ledger may be received. In some examples, the request may be received from, for instance, local user computing device 150, 155. In some arrangements, the request may include a request to add a block or entry in the distributed ledger, modify a block or entry in the distributed ledger, or the like.

At step 502, a modification authentication approval device may be identified. For instance, receiving data from a modification approval user computing device located at a predetermined, authorized approval location may be identified as a modification authentication approval device for use in authenticating a user, validating approval response data, and the like. The identified modification authentication approval device (e.g., predetermined location) may be executed and requirements associated with the modification authentication approval device implemented.

At step 504, a request for authentication/approval data may be transmitted to computing devices associated with modification approval users. In some examples, the request for authentication/approval data may include a request for current location data (e.g., GPS or other data). The request may be transmitted to computing devices associated with some or all of the modification approval users (e.g., all modification approval users, available modification approval users, or the like).

At step 506, authentication/approval response data may be received from one or more computing devices of the modification approval users. For instance, modification approval users may input whether the requested modification is approved or denied and that response data may be transmitted, along with current location data, to the distributed ledger control computing platform 110.

At step 508, a determination is made as to whether the received location data matches location data of predetermined authorized approval locations. If not, the requested modification may be denied at step 510 and/or data from one or more devices may be disregarded. For instance, if one or more of the responding devices includes data indicating a position at an authorized location, and one or more computing devices are not at an authorized location, in some instances, the data from the devices not at an authorized location may be disregarded and the modification may be approved based on devices from approved locations (e.g., if sufficient in number).

If the received location data matches the location data of predetermined authorized approval locations, and any additional approval requirements are met (e.g., a sufficient number of modification approval users have approved the requested modification), at step 512, an instruction to enable modification functionality may be generated. At step 514, the generated instruction may be transmitted to one or more distributed ledger nodes 130, 135. At step 516, the instruction may be executed causing the one or more distributed ledger nodes to execute or implement the modification.

Figure 6A:
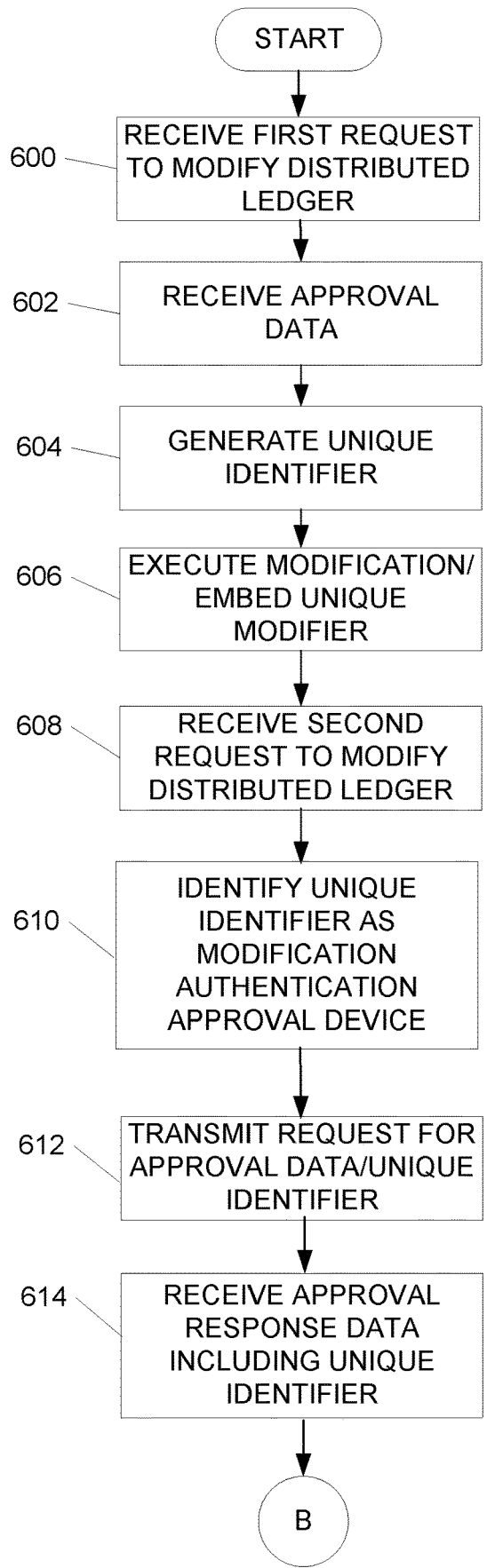
FIGS. 6A and 6B depict yet another illustrative method for implementing distributed ledger control functions in accordance with one or more aspects described herein.
Figure 6B:
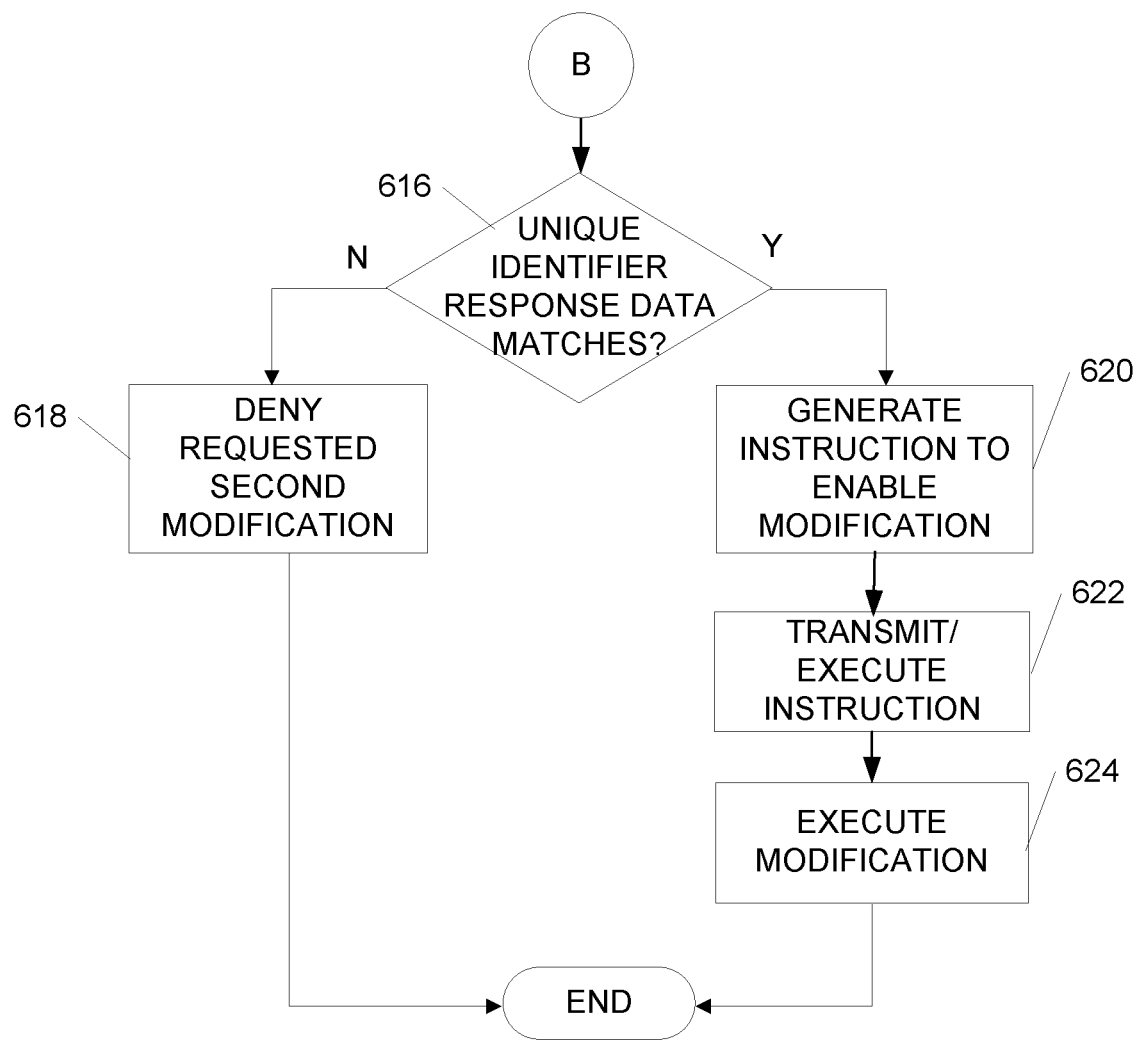

FIGS. 6A and 6B illustrate yet another example method of providing distributed ledger modification authentication and/or approval functions according to one or more aspects described herein. The processes illustrated in FIGS. 6A and 6B are merely some example processes and functions. The steps shown may be performed in a different order, more steps may be added, or one or more steps may be omitted without departing from the invention.

At step 600, a first request to modify a distributed ledger may be received. In some examples, the request may be received from, for instance, local user computing device 150, 155. In some arrangements, the request may include a request to add a block or entry in the distributed ledger, modify a block or entry in the distributed ledger, or the like. At step 602 approval data may be received from one or more modification approval users.

At step 604, a unique identifier associated with approval may be generated. In some examples, the unique identifier may be metadata or other hidden attribute that may be visible or obtainable only to modification approval users. At step 606, the approved modification may be executed and the generated unique identifier may be embedded in the modified block or entry of the distributed ledger.

At step 608, a second or subsequent request to modify the distributed ledger may be received. At step 610, a modification authentication approval device may be identified. For instance, a unique identified that must be provided with approval response data may be identified as a modification authentication approval device. The identified modification authentication approval device (e.g., unique identifier) may be executed and requirements associated with the modification authentication approval device may be implemented.

At step 612, a request for approval data including, for example, the unique identifier to validate the approval data, may be generated and transmitted to computing devices associated with modification approval users. The request may be transmitted to computing devices associated with some or all of the modification approval users (e.g., all modification approval users, available modification approval users, or the like).

At step 614, approval response data, including the requested unique identifier, may be received by the distributed ledger control computing platform 110.

With reference to FIG. 6B, at step 616, the approval response data may be analyzed to determine whether the unique identifier provided in the approval response data matches the unique identifier embedded in the previously modified block or entry. If not, the requested second or subsequent modification may be denied at step 618 and/or the data may be disregarded. For instance, if response data from some of the devices matches and response data from some of the devices does not match, the non-matching device data may be disregarded and the modification may still be approved if the matching devices are sufficient in number and approve the modification.

If, at step 616, the unique identifier matches the embedded unique identifier, at step 620, an instruction to enable modification functionality may be generated. At step 622, the generated instruction may be transmitted to one or more distributed ledger nodes 130, 135. At step 624, the instruction may be executed causing the one or more distributed ledger nodes to execute or implement the modification.

Figure 7A:
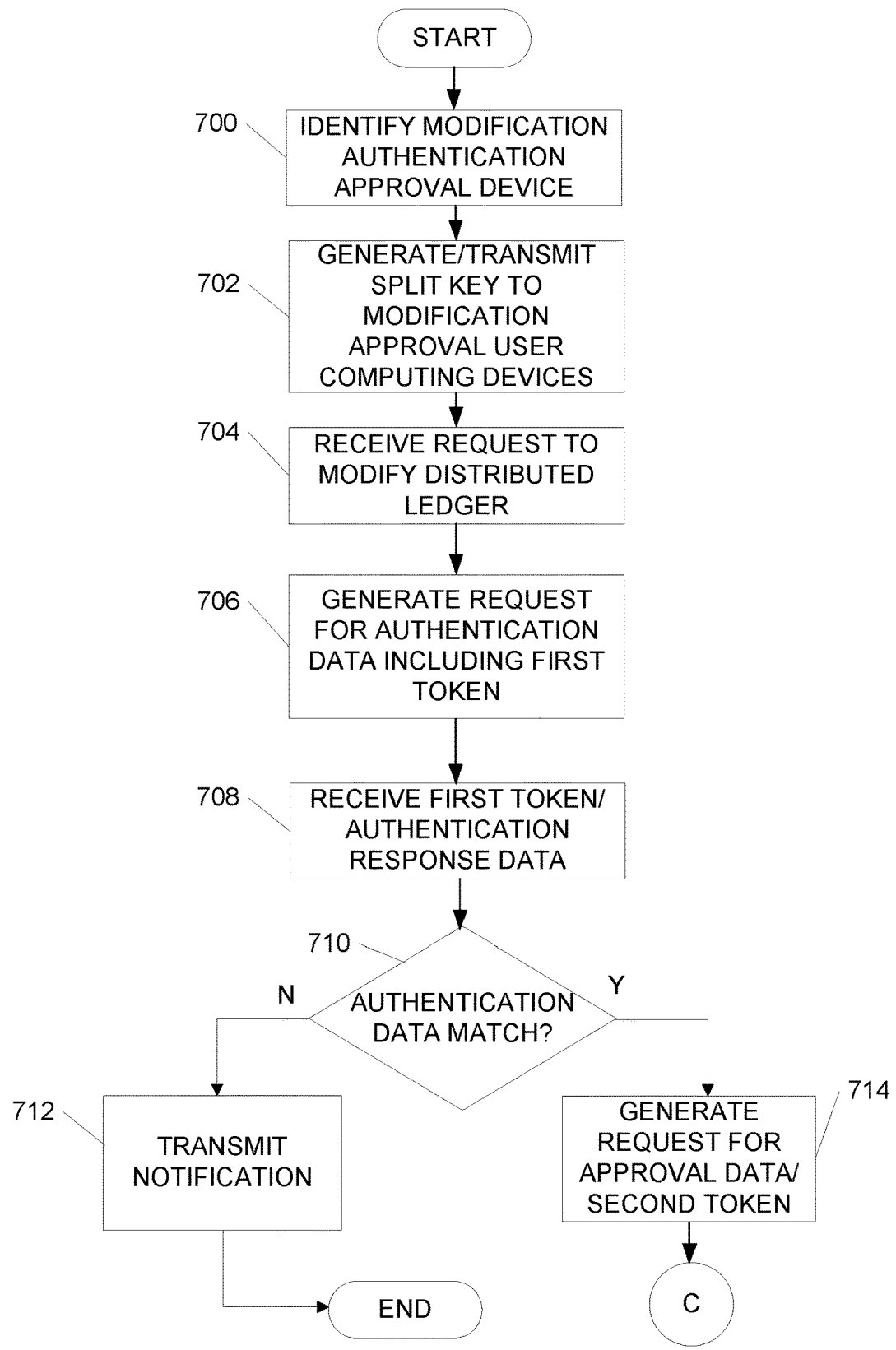
FIGS. 7A and 7B depict still another illustrative method for implementing distributed ledger control functions in accordance with one or more aspects described herein.
Figure 7B:
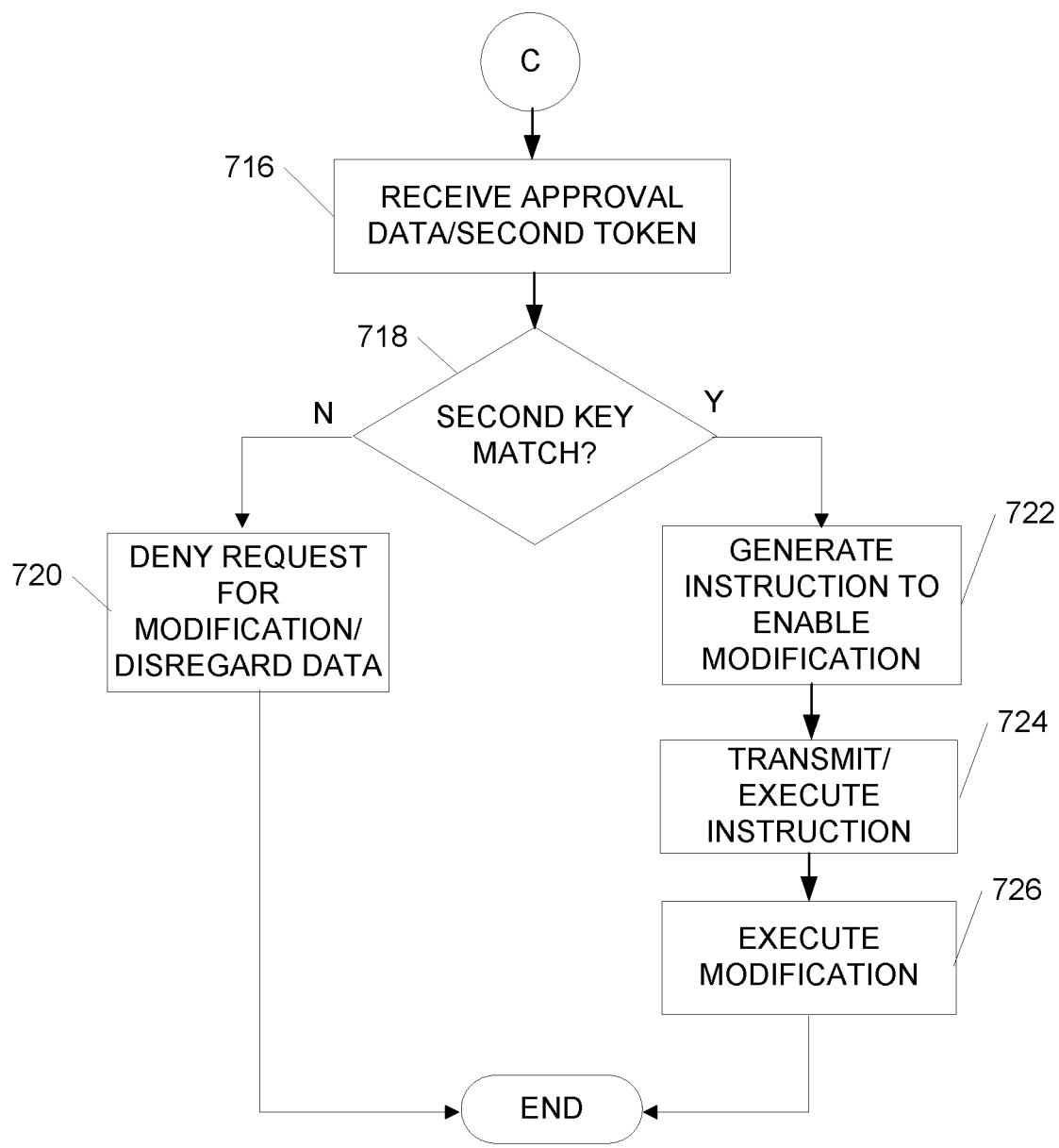

FIGS. 7A and 7B illustrate still another example method of providing distributed ledger modification authentication and/or approval functions according to one or more aspects described herein. The processes illustrated in FIGS. 7A and 7B are merely some example processes and functions. The steps shown may be performed in a different order, more steps may be added, or one or more steps may be omitted without departing from the invention.

With reference to FIG. 7A, at step 700, a modification authentication approval device may be identified. For instance, a split key having a first token for authentication and a second token for validation of approval data may be identified as a modification authentication approval device. At step 702, the identified modification authentication approval device may be executed and the split key may be generated and tokens may be transmitted to computing devices associated with modification approval users.

At step 704, a request to modify a distributed ledger may be received. In some examples, the request may be received from, for instance, local user computing device 150, 155. In some arrangements, the request may include a request to add a block or entry in the distributed ledger, modify a block or entry in the distributed ledger, or the like.

At step 706, in response to receiving the request to modify the distributed ledger, a request for authentication information including a first token of the split key may be generated and transmitted to the computing devices of the modification approval users.

At step 708, authentication response data may be received including the first key. At step 710, a determination may be made as to whether the authentication data matches. For instance, a determination may be made as to whether authentication data, such as a username and password, personal identification number, or the like, matches pre-stored data and whether the first token is present and authentic. If not, at step 712, a notification may be transmitted to users for which authentication response data does not match indicating a match did not occur and the process may end, at least for those modification approval users.

If, at step 710, a match does occur, a request for approval data and the generated second token may be generated at step 714.

With reference to FIG. 7B, at step 716, approval response data, as well as the second token may be received from computing devices associated with one or more modification approval users. For instance, the approval response data may include user input indicating whether the requested modification is approved, as well as the second token. At step 718, a determination is made as to whether the second token is authentic. If not, the request for modification may be denied and/or data may be disregarded at step 720. For instance, approval response data received without the second token may be disregarded and the modification may be approved or denied based on approval response data including the second token.

If, at step 718, the second token is authentic, at step 722, an instruction to enable modification functionality may be generated. At step 724, the generated instruction may be transmitted to one or more distributed ledger nodes 130, 135. At step 726, the instruction may be executed causing the one or more distributed ledger nodes to execute or implement the modification.

As discussed herein, the arrangements provide for controlled access to and modification of a distributed ledger system. The processes discussed herein may be performed in real-time or near real-time in order to obtain current data, provide prompt responses to requests to modify the distributed ledger, and the like.

In many distributed ledger systems, modifications to the distributed ledger may require approval by a predetermined number (or percentage) of designated modification approval users. However, unauthorized users may gain unauthorized access to computing devices or systems of modification approval users and pose as modification approval users in order to approve modifications to the distributed ledger. Accordingly, controlling access to and modification of the distributed ledger is important to reduce or eliminate the impact of potential unauthorized users gaining access. Making authentication to modification systems and approval of modifications more complicated is one aspect that may aid in avoiding unauthorized activity.

For instance, in arrangements in which fewer than all of the modification approval users are available to approve a requested modification, a higher percentage of modification approval users approving the requested modification may be required in order to modify the distributed ledger. In some examples, the availability of the modification approval users may be determined based on geo-tags associated with a modification approval user computing device, user profile, or the like. In other examples, it may be based on a power status of the computing device associated with the modification approval user, current location data (e.g., based on GPS) or the like.

In other examples, modification authentication approval devices may be used to authenticate a modification approval user, validate the approval response data from the modification approval user, and the like. For instance, in some examples, an identifier tag or other unique identifier may be embedded in a modified block or entry in a distributed ledger. The identifier may be accessible or visible only to authorized modification approval users. In subsequent requests to modify the distributed ledger, the system may request a modification approval user to provide the unique identifier in order to authenticate to the system, validate approval response data received, or the like.

In some examples, in addition to embedding the unique identifier in the modified block or entry, the unique identifier may be transmitted to modification approval users who approved the modification. Accordingly, they may have the unique identifier and provide it for subsequent approvals. However, if a modification approval user was not available to approve the modification for which the unique identifier was generated, he or she might not have received the unique identifier. However, by making the unique identifier visible to the modification approval user, the user may extract the embedded identifier from the previously modified block and provide it with authentication/approval response data for the subsequent modification request.

In some examples, the unique identifier may be a metadata attribute associated with the block. For instance, blocks within the distributed ledger may have metadata attributes such as date entered, subject, and the like. The unique identifier may, in some examples, be an additional attribute associated with the block.

In some examples, a user may authenticate to the distributed ledger control computing platform to approve a requested modification using login credentials, such as username and password, biometric data, and the like. Accordingly, aspects such as unique identifier, location being at a predetermined authorized location, and the like, may be provided to validate the approval response data received (e.g., after a user is authenticated to the system).

In some examples, the modification authentication approval device may include a split key including a first token and a second token. The tokens may be transmitted to computing devices associated with modification approval users. Accordingly, a user may provide (e.g., in lieu of or in addition to login credentials) the first token to authenticate to the system and the second token (e.g., in addition to approval response data) as validation of the approval response data.

In some arrangements, one or more of the tokens may be linked to biometric data of the modification approval user, may be associated with a wearable device of the modification approval user, or the like.

Although a split key having two tokens is generally described herein, keys having more than two tokens may be used without departing from the invention. For instance, keys may have four or more tokens and the system may request a particular token in order to authenticate for a particular request, validate approval response data for a particular request, and the like. In some examples, upon authenticating with a first token, the distributed ledger control computing platform or other system may identify one or more of the other tokens to be used to validate approval response data.

Additionally or alternatively, a predetermined authorized approval location may be used as a modification authentication approval device. For instance, a plurality of predetermined authorized approval locations may be generated. In some examples, the predetermined authorized approval locations may include a home of each modification approval user, a place of business of each modification approval user, and the like. Additionally or alternatively, locations may be selected at random and may be arranged around the world to provide flexibility to the modification approval users. In some examples, the system may include location beacons arranged at the predetermined authorized approval locations and a computing device must be within a predetermined distance of the location beacon in order to detect a signal emitted by the location beacon and be considered located at the predetermined authorized approval location.

In still other examples, certain modification approval users, either alone or in combination, may be required to approve certain requests. For instance, if the requested modification includes a high dollar value transaction, the system may require a modification approval user in a first position (such as a chief executive officer) and/or a modification approval user in a second position (e.g., a chief financial officer) to approve the request.

Figure 8:
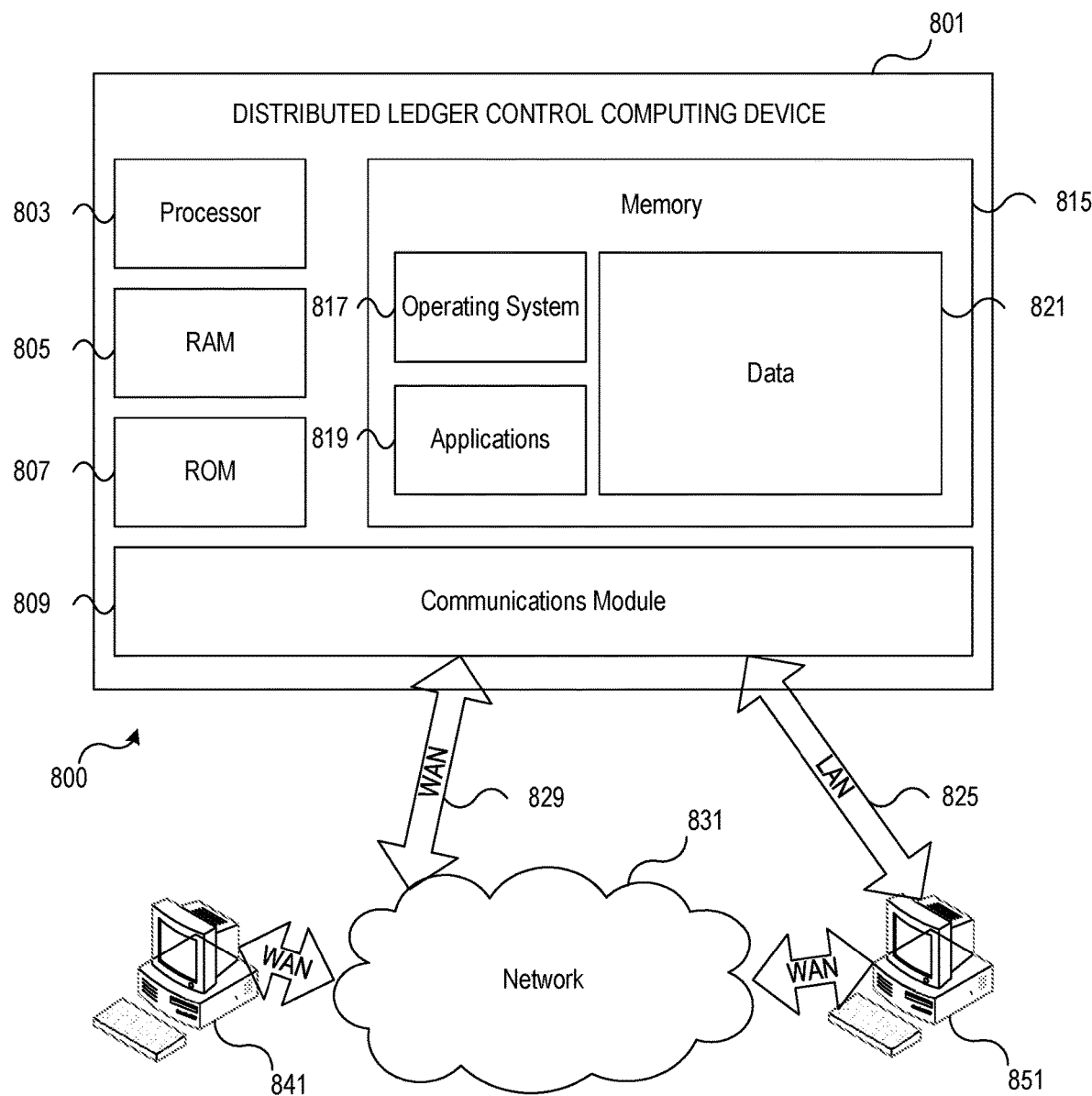
FIG. 8 illustrates one example operating environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include distributed ledger control computing device 801 having processor 803 for controlling overall operation of distributed ledger control computing device 801 and its associated components, including Random Access Memory (RAM) 805, Read-Only Memory (ROM) 807, communications module 809, and memory 815. Distributed ledger control computing device 801 may include a variety of computer readable media. Computer readable media may be any available media that may be accessed by distributed ledger control computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on distributed ledger control computing device 801. Such a processor may execute computer-executable instructions stored on a computer-readable medium.

Software may be stored within memory 815 and/or storage to provide instructions to processor 803 for enabling distributed ledger control computing device 801 to perform various functions as discussed herein. For example, memory 815 may store software used by distributed ledger control computing device 801, such as operating system 817, application programs 819, and associated database 821. Also, some or all of the computer executable instructions for distributed ledger control computing device 801 may be embodied in hardware or firmware. Although not shown, RAM 805 may include one or more applications representing the application data stored in RAM 805 while distributed ledger control computing device 801 is on and corresponding software applications (e.g., software tasks) are running on distributed ledger control computing device 801.

Communications module 809 may include a microphone, keypad, touch screen, and/or stylus through which a user of distributed ledger control computing device 801 may provide input, and may also include one or more of a speaker for providing audio output and a video display device for providing textual, audiovisual and/or graphical output. Computing system environment 800 may also include optical scanners (not shown).

Distributed ledger control computing device 801 may operate in a networked environment supporting connections to one or more remote computing devices, such as computing devices 841 and 851. Computing devices 841 and 851 may be personal computing devices or servers that include any or all of the elements described above relative to distributed ledger control computing device 801.

The network connections depicted in FIG. 8 may include Local Area Network (LAN) 825 and Wide Area Network (WAN) 829, as well as other networks. When used in a LAN networking environment, distributed ledger control computing device 801 may be connected to LAN 825 through a network interface or adapter in communications module 809. When used in a WAN networking environment, distributed ledger control computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 9:
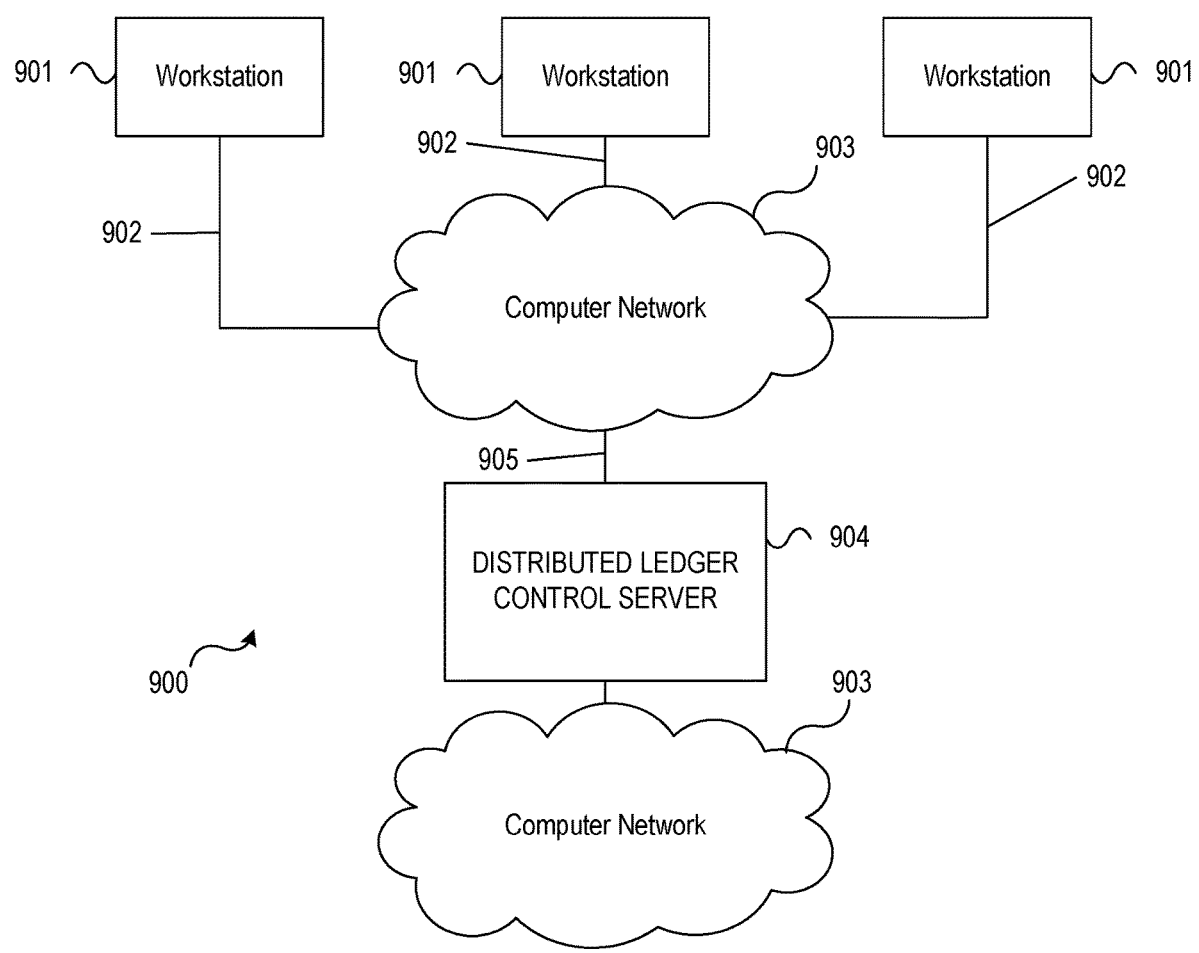
FIG. 9 depicts an illustrative block diagram of workstations and servers that may be used to implement the processes and functions of certain aspects of the present disclosure in accordance with one or more aspects described herein.

FIG. 9 depicts an illustrative block diagram of workstations and servers that may be used to implement the processes and functions of certain aspects of the present disclosure in accordance with one or more example embodiments. Referring to FIG. 9, illustrative system 900 may be used for implementing example embodiments according to the present disclosure. As illustrated, system 900 may include one or more workstation computers 901. Workstation 901 may be, for example, a desktop computer, a smartphone, a wireless device, a tablet computer, a laptop computer, and the like, configured to perform various processes described herein. Workstations 901 may be local or remote, and may be connected by one of communications links 902 to computer network 903 that is linked via communications link 905 to distributed ledger control server 904. In system 900, distributed ledger control server 904 may be a server, processor, computer, or data processing device, or combination of the same, configured to perform the functions and/or processes described herein. Server 904 may be used to receive requests to modify a distributed ledger, identify one or more modification authentication approval devices, evaluate availability of modification approval user computing devices, identify approval requirements, determine whether approval and/or authentication requirements are met, generate instructions enabling modification, and the like.

Computer network 903 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 902 and 905 may be communications links suitable for communicating between workstations 901 and distributed ledger control server 904, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A distributed ledger control computing platform, comprising:
    at least one processor;
    a communication interface communicatively coupled to the at least one processor; and
    memory storing computer-readable instructions that, when executed by the at least one processor, cause the distributed ledger control computing platform to:
        receive a request to modify a distributed ledger;
        identify at least one modification authentication approval device, each modification authentication approval device having one or more requirements for at least one of: authenticating a modification approval user and validating approval data received from the modification approval user;
        execute, via the identified at least one modification authentication approval device, the one or more requirements;
        generate a request for authentication/approval data;
        transmit the generated request for authentication/approval data to computing devices associated with a plurality of modification approval users;
        receive authentication/approval response data from the computing devices associated with the plurality of modification approval users;
        compare the received authentication/approval response data to the one or more requirements;
        responsive to determining that the authentication/approval response data meets the one or more requirements:
            generate an instruction enabling modification functionality; and
            transmit the generated instruction to at least one distributed ledger node;
            wherein the generated instruction causes the at least one distributed ledger node to implement the requested modification; and
        responsive to determining that the authentication/approval response data does not meet the one or more requirements, deny the requested modification.

2. The distributed ledger control computing platform of claim 1, wherein the modification authentication approval device includes one or more predetermined approval locations and wherein the authentication/approval response data includes current location data for the computing devices associated with the plurality of modification approval users.

3. The distributed ledger control computing platform of claim 2, wherein comparing the received authentication/approval response data to the one or more requirements further includes comparing the current location data for the computing devices associated with the plurality of modification approval users to the one or more predetermined approval locations to determine whether the current location data matches location data for one of the predetermined approval locations.

4. The distributed ledger control computing platform of claim 1, wherein the modification authentication approval device includes a split key including a first token and a second token and where the memory stores further instructions that, when executed, causes the distributed ledger control computing platform to transmit the first token and the second token to the computing devices associated with the plurality of modification approval users.

5. The distributed ledger control computing platform of claim 4, wherein receiving authentication/approval response data further includes receiving the first token for use in authenticating a modification approval user and receiving the second token for use in validating approval response data received from the modification approval user.

6. The distributed ledger control computing platform of claim 1, wherein the modification authentication approval device includes a unique identifier embedded in a previously modified block of the distributed ledger.

7. The distributed ledger control computing platform of claim 6, wherein receiving authentication/approval response data includes receiving the unique identifier.

8. One or more non-transitory computer-readable media storing instructions that, when executed by a computing platform comprising at least one processor, memory, and a communication interface, cause the computing platform to:
    receive a request to modify a distributed ledger;
    identify at least one modification authentication approval device, each modification authentication approval device having one or more requirements for at least one of: authenticating a modification approval user and validating approval data received from the modification approval user;
    execute, via the identified at least one modification authentication approval device, the one or more requirements;
    generate a request for authentication/approval data;
    transmit the generated request for authentication/approval data to computing devices associated with a plurality of modification approval users;
    receive authentication/approval response data from the computing devices associated with the plurality of modification approval users;
    compare the received authentication/approval response data to the one or more requirements;
    responsive to determining that the authentication/approval response data meets the one or more requirements:
        generate an instruction enabling modification functionality; and
        transmit the generated instruction to at least one distributed ledger node;

wherein the generated instruction causes the at least one distributed ledger node to implement the requested modification; and responsive to determining that the authentication/approval response data does not meet the one or more requirements, deny the requested modification.

9. The one or more non-transitory computer-readable media of claim 8, wherein the modification authentication approval device includes one or more predetermined approval locations and wherein the authentication/approval response data includes current location data for the computing devices associated with the plurality of modification approval users.

10. The one or more non-transitory computer-readable media of claim 9, wherein comparing the received authentication/approval response data to the one or more requirements further includes comparing the current location data for the computing devices associated with the plurality of modification approval users to the one or more predetermined approval locations to determine whether the current location data matches location data for one of the predetermined approval locations.

11. The one or more non-transitory computer-readable media of claim 8, wherein the modification authentication approval device includes a split key including a first token and a second token and further including instructions that, when executed, cause the computing platform to transmit the first token and the second token to the computing devices associated with the plurality of modification approval users.

12. The one or more non-transitory computer-readable media of claim 11, wherein receiving authentication/approval response data further includes receiving the first token for use in authenticating a modification approval user and receiving the second token for use in validating approval response data received from the modification approval user.

13. The one or more non-transitory computer-readable media of claim 8, wherein the modification authentication approval device includes a unique identifier embedded in a previously modified block of the distributed ledger.

14. The one or more non-transitory computer-readable media of claim 13, wherein receiving authentication/approval response data includes receiving the unique identifier.

* * * * *